United States Patent
Nalwa

[19]

[11] Patent Number: 6,141,145
[45] Date of Patent: Oct. 31, 2000

[54] STEREO PANORAMIC VIEWING SYSTEM

[75] Inventor: Vishvjit Singh Nalwa, Middletown, N.J.

[73] Assignee: Lucent Technologies, Murray Hill, N.J.

[21] Appl. No.: 09/141,867

[22] Filed: Aug. 28, 1998

[51] Int. Cl.⁷ ............................ G02B 23/08; G02B 17/00
[52] U.S. Cl. ........................ 359/403; 359/462; 359/726; 359/831; 348/36
[58] Field of Search .................................... 359/399–406, 359/466, 429, 471, 431, 627–628, 632, 618, 725–726, 850, 831, 462; 348/36–39, 384; 353/30, 94–99

[56] References Cited

U.S. PATENT DOCUMENTS

| | | | |
|---|---|---|---|
| 2,267,813 | 12/1941 | Buckner | 250/141 |
| 2,304,434 | 12/1942 | Ayres | 88/24 |
| 3,144,806 | 8/1964 | Smith | 88/166 |
| 3,286,590 | 11/1966 | Brueggemann | 88/24 |
| 3,420,605 | 1/1969 | Kipping | 352/69 |
| 3,506,344 | 4/1970 | Petit, Jr. | 352/69 |
| 3,740,469 | 6/1973 | Herndon | 178/6.8 |
| 3,998,532 | 12/1976 | Dykes | 352/69 |
| 4,078,860 | 3/1978 | Globus et al. | 352/69 |
| 4,355,328 | 10/1982 | Kulik | 358/87 |
| 4,357,081 | 11/1982 | Moddemeijer | 352/69 |
| 4,429,957 | 2/1984 | King | 350/423 |
| 4,589,030 | 5/1986 | Kley | 358/225 |
| 4,859,046 | 8/1989 | Traynor et al. | 350/627 |
| 4,890,314 | 12/1989 | Judd et al. | 379/53 |
| 4,982,092 | 1/1991 | Johle | 250/332 |

(List continued on next page.)

FOREIGN PATENT DOCUMENTS

| | | |
|---|---|---|
| 0 484 801 A3 | 5/1992 | European Pat. Off. . |
| 0 519 774 | 12/1992 | European Pat. Off. . |
| 0 552 204 | 1/1993 | European Pat. Off. . |
| 0 793 074 A1 | 9/1997 | European Pat. Off. . |
| 1206316 | 2/1960 | France . |
| 1528819 | 5/1968 | France . |
| C-37 39 697 | 12/1988 | Germany . |
| 60-20692 | 2/1985 | Japan . |
| WO 92 14341 | 8/1992 | WIPO . |
| WO-A-93 25927 | 12/1993 | WIPO . |
| WO 97/43854 | 11/1997 | WIPO . |

OTHER PUBLICATIONS

Starchild: Galaxies, XP002124075, Internet: URL:http://starchild.gsfc.nasa.gov/...w/universe_levell/galaxies.htlm.
IEICE Transaction on Communications, vol. E77–B, No. 2, Feb. 1, 1994, pp. 232–238, XP000447116, Kazutake Uehira et al., "Seamless Image–Connection Technique For A Multiple–Sensor Camera," p. 233, col. 1, line 19–p. 234, col. 1, line 14.
"Omnidirectional Imaging with Hyperboloidal Projection," by K. Yamazawa, et al, *1993 IEEE Intern'l Conference*, Yokohama, Japan, Jul. 26–30, 1993, pp. 1029–1034.
Derwent Publication on DE 3930–774–A, "Projector for video colour picture."
"Panoramic Optics Give U.S. Tankers A Better Than Birdseye View," by D. Rees and M. Lisic, Industrial Photography, Apr. 1963, pp. 36, 37, and 69.

*Primary Examiner*—Thong Nguyen
*Attorney, Agent, or Firm*—Christopher N. Malvone

[57] ABSTRACT

A stereo panoramic view is provided through the use of multiple virtual optical centers. A reflective polyhedral cement, such as a pyramid, redirects the field of view of each camera in a first set of cameras to form a group of substantially co-located virtual optical centers at a first location within the pyramid. The pyramid also redirects the field of view of each camera in a second set of cameras to form a group of substantially co-located virtual optical centers at a second location within the pyramid. Panoramic images from the first and second virtual optical centers provide a stereo panoramic view when one panoramic image is provided to a user's left eye and the other panoramic image is provided to the user's right eye.

28 Claims, 18 Drawing Sheets

U.S. PATENT DOCUMENTS

| | | | |
|---|---|---|---|
| 4,985,762 | 1/1991 | Smith | 358/87 |
| 5,016,109 | 5/1991 | Gaylord | 358/225 |
| 5,023,725 | 6/1991 | McCutchen | 358/231 |
| 5,030,823 | 7/1991 | Obdeijn | 250/223 |
| 5,040,055 | 8/1991 | Smith | 358/87 |
| 5,130,794 | 7/1992 | Ritchey | 358/87 |
| 5,179,440 | 1/1993 | Loban et al. | 358/87 |
| 5,187,571 | 2/1993 | Bruan et al. | 358/85 |
| 5,194,959 | 3/1993 | Kaneko et al. | 358/225 |
| 5,236,199 | 8/1993 | Thompson, Jr. | 273/439 |
| 5,245,175 | 9/1993 | Inabata | 250/201.8 |
| 5,264,881 | 11/1993 | Brooke | 353/94 |
| 5,264,945 | 11/1993 | Kannegundla et al. | 358/444 |
| 5,305,029 | 4/1994 | Yoshida et al. | 353/37 |
| 5,452,135 | 9/1995 | Maki et al. | 359/834 |
| 5,495,576 | 2/1996 | Ritchey | 395/125 |
| 5,526,133 | 6/1996 | Paff | 358/335 |
| 5,539,483 | 7/1996 | Nalwa | 353/94 |
| 5,619,255 | 4/1997 | Booth | 348/36 |
| 5,684,626 | 11/1997 | Greenberg | 359/388 |
| 5,708,469 | 1/1998 | Herzberg | 348/39 |
| 5,745,305 | 4/1998 | Nalwa | 359/725 |

STEREO PANORAMIC VIEWING SYSTEM

CROSS REFERENCE TO RELATED INVENTIONS

This application is related to the following commonly assigned U.S. Patent Applications: "Panoramic Viewing Apparatus", Ser. No. 08/431,356 which issued as U.S. Pat. No. 5,745,305; "Method And System For Panoramic Viewing", filed Apr. 28, 1995, Ser. No. 08/431354; which issued as U.S. Pat. No. 5,990,934; "High Resolution Viewing System", Ser. No. 08/497673, which issued as U.S. Pat. No. 5,793,527; "Panoramic Projection Apparatus", Ser. No. 08/497341, which issued as U.S. Pat. No. 5,539,483; "Spherical Viewing/Projection Apparatus", filed Nov. 30, 1995, Ser. No. 08/565501; "Panoramic Viewing System With Offset Virtual Optical Center", filed Oct. 7, 1997, Ser. No. 08/946443; commonly assigned and concurrently filed U.S. Patent Application entitled "Compact High Resolution Panoramic Viewing System", filed Aug. 28, 1998, Ser. No. 09/141885; and commonly assigned and concurrently filed U.S. Patent Application entitled "Panoramic Viewing System With Support Stand", filed Aug. 28, 1998, Ser. No. 09/141883.

BACKGROUND OF THE INVENTION

1. Field of the Invention

The present invention relates to a viewing system; more particularly, a panoramic viewing system.

2. Description of the Related Art

In an effort to operate more efficiently, it is desirable to perform some tasks using telepresence. Telepresence refers to providing visual or other types of sensory information from a device at a remote site to a user that makes the user feel as if he/she is present at the remote site. For example, many businesses now hold meetings using telepresence. Telepresence is also useful for distance learning and remote viewing of events such as concerts and sporting events. A more realistic telepresence is provided to a user by providing the user with the capability to switch between views, and thereby mimic, for example, looking around a meeting room.

In the past, when several views were made available to a user, several cameras with different optical centers were used. Such a situation is illustrated in FIG. 1. FIG. 1 illustrates cameras 2, 4, 6, and 8 with optical centers 10, 12, 14, and 16, respectively. When the user decided to change views, he or she simply switched between cameras. In more sophisticated systems, when a user decided to change views, he or she was able to obtain a view from optical centers 10, 12, 14, or 16 as well as from additional optical centers 18, 20, 22, 24, or 26. Views associated with optical centers such as 18, 20, 22, 24, and 26 were obtained by using views from the two cameras nearest to the selected optical center. For example, a view from optical center 18 was obtained by using the views from cameras 2 and 4 and interpolating between the two views so as to simulate a view from optical center 18. Such procedures introduced irregularities into views. In addition, forming these interpolated views required a large amount of computational power and time, and thereby made this technique expensive and slow to respond to a user's commands. This computational overhead also limited the number of users that could simultaneously use the system.

SUMMARY OF THE INVENTION

One embodiment of the present invention provides an omnidirectional or panoramic viewer in which multiple several cameras effectively have a common optical center, at least one of these cameras having its field of view redirected by a planar mirror. The field of view of each of the cameras is arranged to form a continuous 360 degree view of an area when taken as a whole. The user can sweep through 360 degrees of viewing, where each view has the same or nearly the same optical center, by simply using the output of one camera, more than one or the combination of cameras without requiring the computational overhead of interpolation used in the prior art. Such an arrangement may be used to enhance use of virtual meeting rooms by allowing a viewer to see the meeting room in a more natural format. This format corresponds closely to a person sitting in the actual meeting who simply turns his or her head to change the view at a particular time.

In another embodiment of the invention, the cameras are positioned so that they each view a different reflective surface of a solid or hollow polyhedron such as a solid or hollow pyramid. This results in each camera having a virtual optical center positioned within the pyramid. The cameras are positioned so that their virtual optical centers are offset from each other. The offsets produce narrow blind regions that remove image distortions received from the edges of the pyramid's reflective surfaces.

In still another embodiment of the invention, a stereo panoramic view is provided through the use of multiple virtual optical centers. A reflective polyhedral element, such as a pyramid, redirects the field of view of each camera in a first set of cameras to form a group of substantially co-located virtual optical centers at a first location within the pyramid. The pyramid also redirects the field of view of each camera in a second set of cameras to form a group of substantially co-located virtual optical centers at a second location within the pyramid. Panoramic images from the first and second virtual optical centers provide a stereo panoramic view when one panoramic image is provided to a user's left eye and the other panoramic image is provided to the user's right eye.

In yet another embodiment of the present invention, polyhedrons such as pyramids having reflective surfaces are stacked base to base or nested within each other to produce a compact panoramic viewer. Using multiple reflective polyhedrons in such a manner permits using many cameras with the same or nearly the same virtual optical center. Using many cameras divides a large viewing area into many smaller areas where an individual camera views each smaller area. Since each camera views a smaller area, increased resolution is provided to the user.

In another embodiment of the present invention, the reflective polyhedron such as a pyramid is supported by a post that passes through the vertex of the pyramid. Cameras are then mounted to the post to provide a panoramic viewer with a mounting structure and a structure for supporting individual cameras.

In still another embodiment of the present invention, a nearly spherical view is provided to a user by placing a camera at the common virtual optical center of the viewer. In order to enhance the spherical view, the camera at the common virtual optical center may use a wide angle lens.

In yet another embodiment of the present invention, the viewing device may include any type of image processing device. If the image processing device is a camera or other type of image capture device, a panoramic image is captured for the user, and if the image processing device is a projector or other type of image producing device, a panoramic image is produced for the user.

DESCRIPTION OF THE PREFERRED EMBODIMENT

Figure 1:
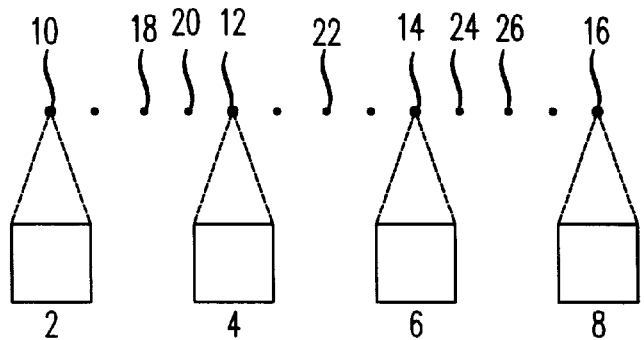
FIG. 1 illustrates a prior art multiple camera viewing system.
Figure 2:
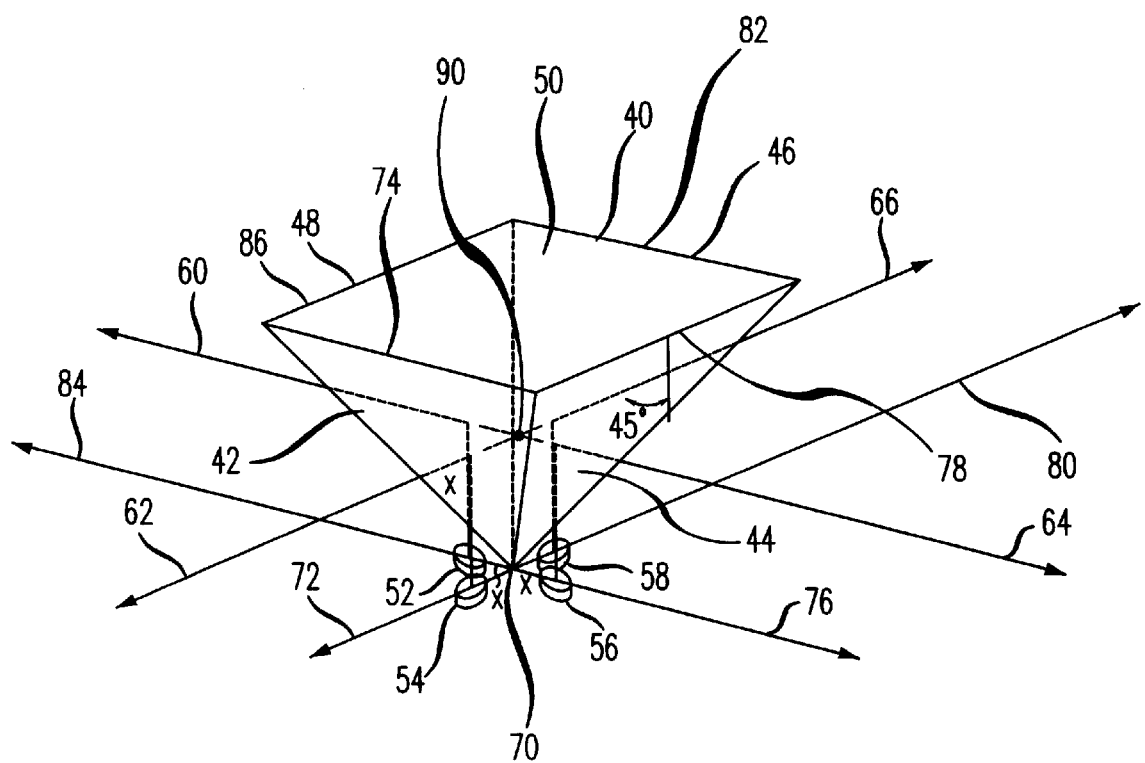
FIG. 2 illustrates a four camera omnidirectional or panoramic viewing system using a four-sided pyramid with reflective surfaces.

FIG. 2 illustrates a four camera system for providing a 360 degree view to a user, where the cameras each have a common or nearly common virtual optical center within the pyramid. Pyramid 40 has reflective sides 42, 44, 46, and 48 and may be a hollow, solid, or truncated structure. In a preferred embodiment, each of the reflective sides forms a 45 degree angle with a plane parallel to base 50 and passing through the vertex of pyramid 40. Cameras 52, 54, 56, and 58 are associated with pyramid reflective surfaces 48, 42, 44, and 46, respectively. The cameras may be image gathering devices such as an optical scanner. As a result, camera 52 views a reflection from surface 48 to enable it to view objects in the direction of arrow 60. Camera 54 views a reflection from surface 42 to view objects in the direction of arrow 62. Camera 56 views a reflection from surface 44 to view objects in the direction of arrow 64, and camera 58 views a reflection from surface 46 to view objects in the direction of arrow 66. Each camera has a 90 degree field of view; however, larger fields of view may be used and the overlapping portion of the images may be removed by deleting or combining the pixels associated with the overlapping views. The combination of the four cameras viewing reflections from their associated reflective surfaces on pyramid 40, produce a 360 degree view of the area surrounding pyramid 40. When the mirrors are at 45 degree with respect to the pyramid base, it is desirable to locate the optical center of each camera on a plane that is parallel to base 50 and intersects vertex 70 of pyramid 40. Each camera's optical center should also be located on a line that passes through vertex 70 and is perpendicular to the base line of the camera's associated reflective surface. For example, the optical center of camera 54 is located on line 72. Line 72 is perpendicular to base line 74 of reflective surface 42. Line 72 is in a plane that passes through vertex 70 and is parallel to base 50. Likewise, the optical center of camera 56 is positioned on line 76 which is perpendicular to baseline 78, the optical center of camera 58 is positioned on line 80 which is perpendicular to base line 82, and the optical center of camera 52 is positioned on base line 84 which is perpendicular to base line 86.

Each camera optical center is positioned on one of the above described lines at a distance X from vertex 70 and each camera has its optical axes or direction of view pointing perpendicular to base 50. (The distance X should be such that the reflective surface reflects as much of the camera's field of view as desired; however, the defects in the reflective surface become more visible when the camera is moved closer to the reflective surface.) This positioning of optical centers results in the cameras sharing a virtual optical center located at, or substantially at, position 90. Virtual optical center 90 is located a distance X from the vertex 70 on a line that passes through vertex 70 and is perpendicular to base 50.

Although a pyramid configuration has been discussed in this example, different planar mirror geometries may be used to redirect fields of view so that the cameras have virtual optical centers that are substantially co-located. For example, solid, hollow or partial polyhedrons may be used. Additionally, in the case of a pyramid configuration the base and vertex do not have to be physically present and can be thought of as conceptual aids such as a base plane or end and vertex point or end.

Figure 3:
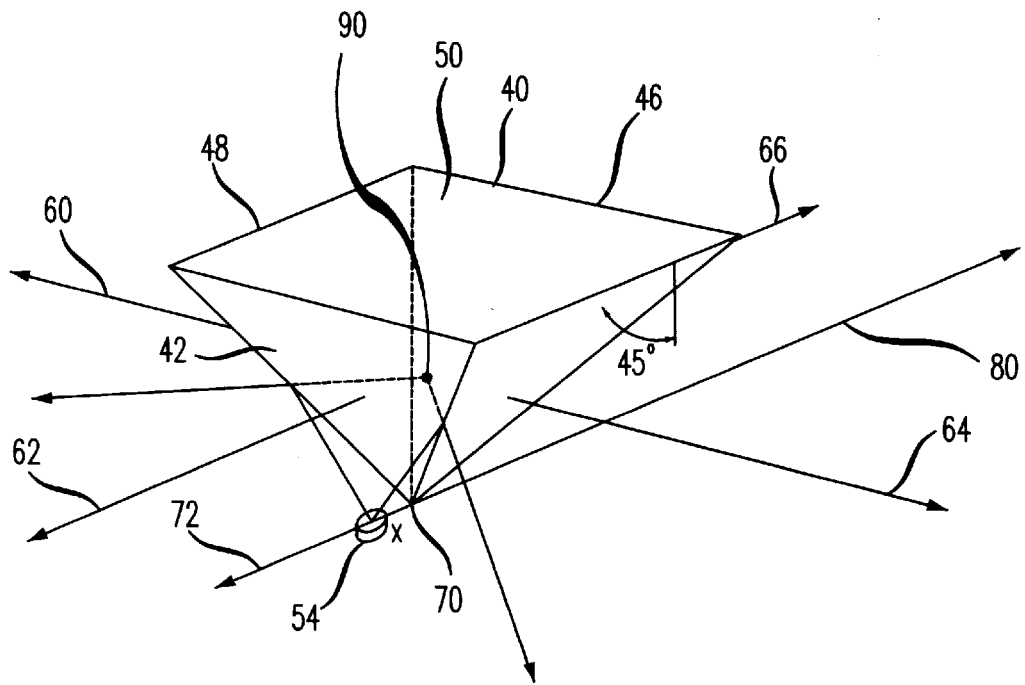
FIG. 3 illustrates how a reflective surface of the pyramid is used to provide each camera with a common optical center.

FIG. 3 illustrates another view of pyramid 40 where only camera 54 is shown for the sake of simplicity. Camera 54 is positioned on line 72 so as to have a virtual optical center at, or nearly at, position 90 within pyramid 40. If camera 54 has a 90 degree field of view in the direction perpendicular to base 50, and if the optical center of camera 54 is at a distance of X from vertex 70 along line 72, camera 54 has a 90 degree view in the direction of arrow 62. In similar fashion, cameras 56, 58, and 52 have 90 degree views in the direction of arrows 64, 66, and 60, respectively. This arrangement inexpensively produces a 360 degree field of view of an area because cameras with a 90 degree field of view have relatively inexpensive optics.

Figure 4:
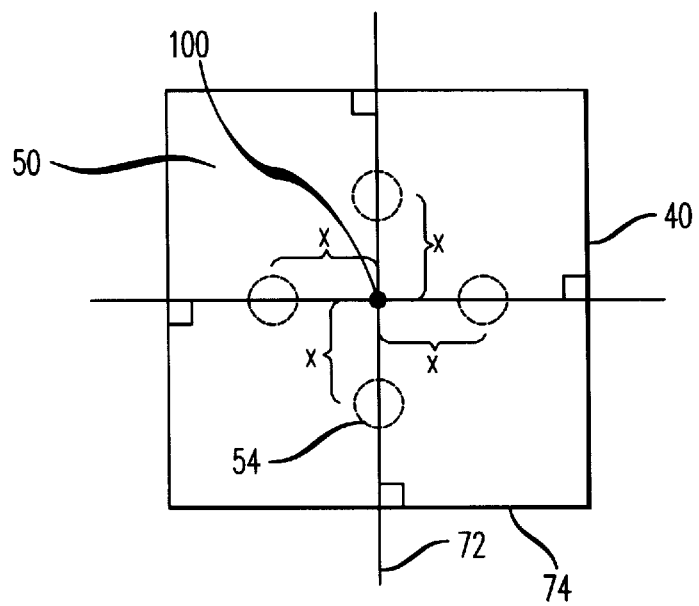
FIG. 4 illustrates the top view of the pyramid illustrating the camera positions.

FIG. 4 is a top view of pyramid 40. FIG. 4 illustrates the placement of the optical center of camera 54 along line 72. Line 72 should be in a plane passing through vertex 70 and is parallel to base 50. The line should also be perpendicular to base line 74 of pyramid 40. The camera's optical center should be positioned a distance X, or a distance substantially equal to X, from vertex 70 along line 72. Point 100 is located on base 50 at a position where a line from vertex 70 perpendicularly intersects base 50. In a similar fashion, the optical centers of cameras 56, 58 and 52 are positioned the distance X, or a distance substantially equal to X, along lines 76, 80 and 84, respectively.

Figure 5:
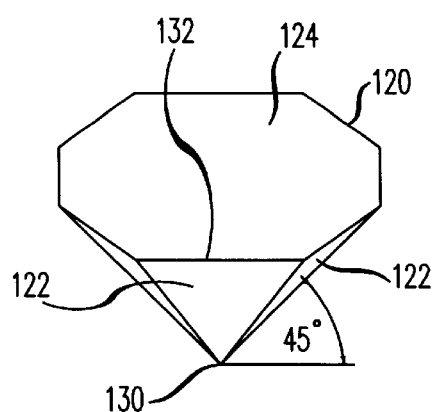
FIG. 5 illustrates an eight-sided pyramid with reflective side surfaces.

FIG. 5 illustrates an eight-sided pyramid 120. Pyramid 120 has reflective surfaces 122 where each of surfaces 122 forms a 45 degree angle with a plane that passes through vertex 130 and is parallel to base 124. As with the four-sided pyramid of FIG. 2, each reflective surface of FIG. 5 may have a camera associated with it. Each camera's optical center is positioned on a line that is in a plane that passes through vertex 130 and is parallel to base 124. The line is perpendicular to base line 132 of the reflective surface associated with the camera to be positioned. Using an eight-sided pyramid offers the advantage of using cameras with only a 45 degree horizontal field of view to obtain a 360 degree view. Cameras with only a 45 degree field of view have inexpensive optics and enable a 360 degree view to be constructed using relatively inexpensive components.

Figure 6:
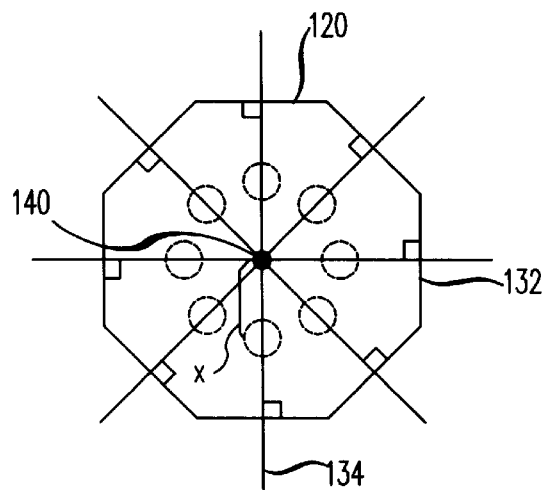
FIG. 6 is a top view of the pyramid of FIG. 5.

FIG. 6 is a top view of pyramid 120. As discussed with regard to FIG. 5, each camera's optical center is positioned along a line 134 which is in a plane that passes through vertex 130 and is parallel to base 124. The optical centers are positioned a distance X, or a distance substantially equal to X, along line 134 which is perpendicular to the appropriate base line 132. Point 140 is on base 124 at the point of intersection between base 124 and a line that passes through vertex 130 and is perpendicular to base 124.

Polyhedrons or pyramids having more or less reflective sides may be used. The advantage of using pyramids having a large number of sides is that cameras with moderate to small fields of view may be used. Cameras with moderate fields of view have relatively inexpensive optics. The number of sides used in a pyramid is somewhat limited by the cost of providing a large number of cameras. A 360 degree view of a scene may be provided using a pyramid having three reflective sides. It may be expensive to use only a three-sided pyramid in order to provide a 360 degree field of view. This embodiment of the invention uses three cameras each with a 120 degree field of view, and cameras with such a wide field of view use relatively expensive optical components.

In applications where a full 360 degree view is not desired, it is possible to build a viewer that does not have a camera associated with each reflective surface of the pyramid. In addition to eliminating an unnecessary camera, it is also possible to eliminate an unnecessary pyramid or polyhedron surface by using reflective elements that are partial pyramids or partial polyhedrons. Additionally, the reflective element may include at least one non-reflective facet.

Although a pyramid configuration has been discussed in this example, different planar mirror geometries may be used to redirect fields of view so that the cameras have virtual optical centers that are substantially co-located. For example, solid, hollow or partial polyhedrons may be used. Additionally, in the case of a pyramid configuration the base and vertex do not have to be physically present and can be thought of as conceptual aids such as a base plane or end and vertex point or end.

Figure 7:
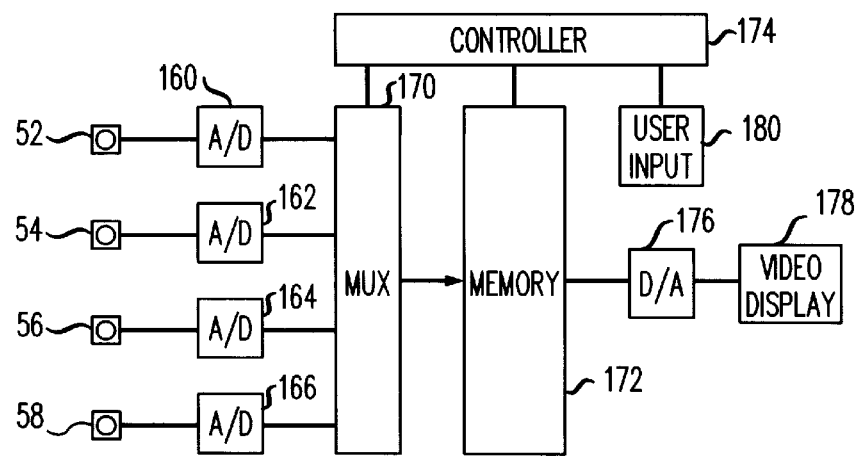
FIG. 7 is a block diagram of a system to control data produced by the cameras.

FIG. 7 illustrates a block diagram of a system for controlling data produced by the cameras of a viewing device such as the viewing device described in FIGS. 2 through 4. Cameras 52, 54, 56 and 58 obtain a 360 degree view of an area via their associated reflective surfaces of pyramid 40. The image signal or output signal of cameras 52, 54, 56 and 58 are passed through analog to digital converters (A/D) 160, 162, 164, and 166, respectively. The output of the cameras can be thought of as a stream of pixels and the output of the A/Ds can be thought of as data representative of the pixels from the cameras. The output of the A/Ds are passed through mux 170. Mux 170 allows the pixel data from each of the A/Ds to reach memory 172. Controller 174 cycles the select lines of mux 170 so that the outputs of all of the A/Ds are stored in memory 172. Mux 170 is switched at a rate that is four times the pixel rate of the cameras. If more or less cameras are used, the rate at which mux 170 is switched will be increased or slowed accordingly. It is also possible to eliminate mux 170 and to store the output of each A/D in a separate memory. Controller 174 is implemented using a microprocessor which provides control signals to counters that control the switching of mux 170 and counters used to provide addressing to memory 172. The control signals to the counters include reset, enable and a starting offset.

As a result of the pixel information being passed to memory 172, memory 172 contains a 360 degree view of a scene. Pixel information stored in memory 172 is passed through digital to analog converter (D/A) 176 and to video display 178. The actual portion of memory 172 that is passed to video display 178 via D/A 176 is controlled via user input device 180. User input device 180 may be a common device such as a mouse, joystick, or keyboard. The user may simply lean a joystick to the right to shift his view to the right, lean the joystick to the left to shift the view to the left, or leave the joystick in the center to keep the view unchanged. Based on the input from user device 180, controller 174 varies offsets and starting addresses that are used to provide addressing to memory 172.

Figure 8:
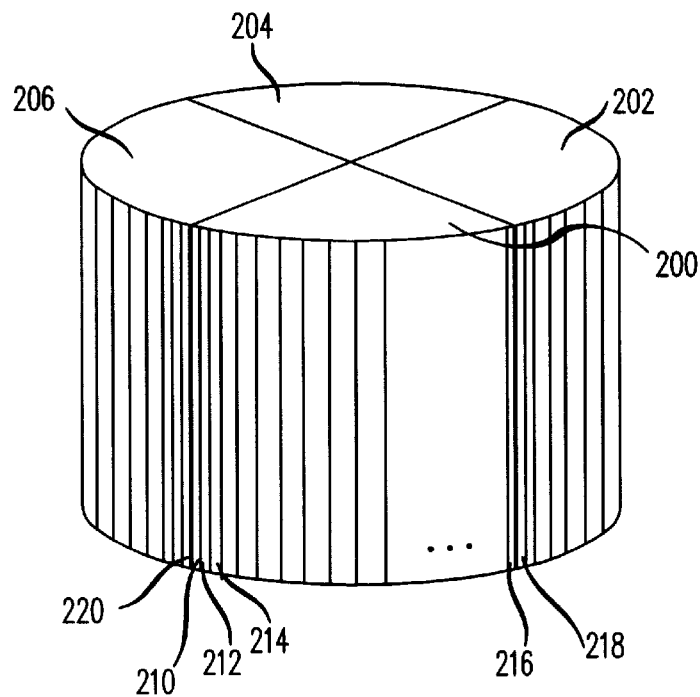
FIG. 8 illustrates the association between the data received from the cameras and the view presented to a user.

FIG. 8 illustrates the relationship between the data provided by the cameras and the view available to the user. Since the cameras share a virtual optical center, the view can be thought of as a cylindrical view. Sector 200 can be thought of as representing the information provided by camera 52, sector 202 can be thought of as representing the information provided by camera 54, sector 204 can be thought of as representing the information provided by camera 56, and sector 206 can be thought of as representing the information provided by camera 58. The surface of the cylinder in each sector can be thought of as a collection of columns, where each column is composed of pixels. For example, sector 200 can be thought of as a collection of columns including columns 210, 212, 214, and 216.

Likewise, the output produced by camera 54 can be thought of as a collection of columns which include column 218 in sector 202 and the output of camera 58 can include columns such as column 220 in sector 206.

Figure 9:
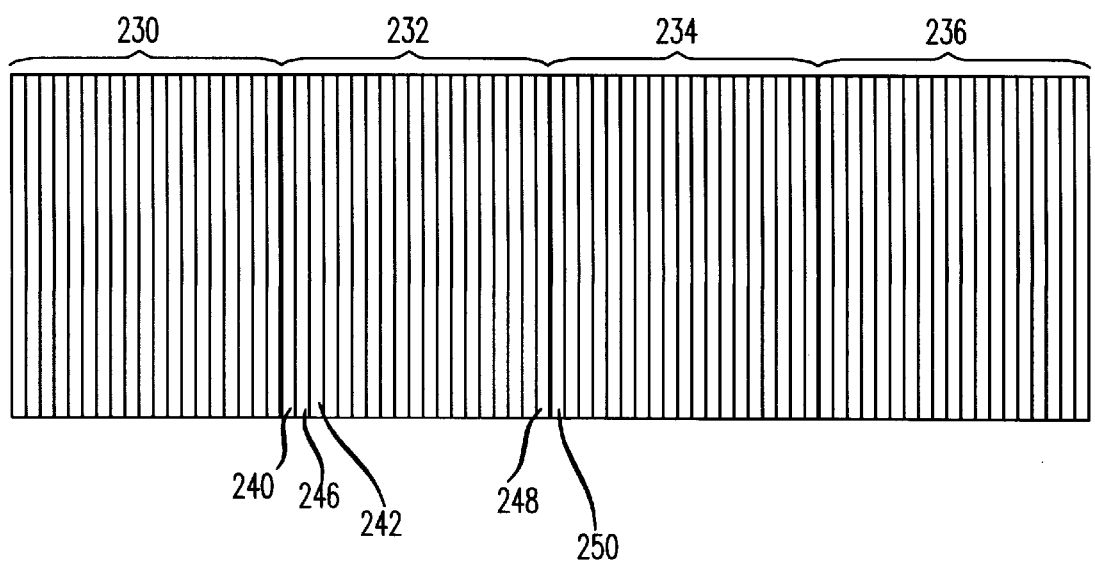
FIG. 9 illustrates an addressing scheme for the memory of FIG. 7.

FIG. 9 illustrates how memory 172 is divided to provide easy access to different views based on signals from user input device 180. Sections 230, 232, 234, and 236 correspond to sectors 206, 200, 202, and 204, respectively. Each of sections 230, 232, 234, and 236 can be thought of as a block within memory 172. The blocks in memory 172 are broken into columns of sequential addresses. The first column of memory segment 230 corresponds to the first column of pixels of sector 206. The number of memory positions associated with a column should be at least sufficient to have one location for each pixel in a particular column. For example, if a column of pixels from FIG. 8 includes 1000 pixels, each column associated with the memory segments of FIG. 9 should have at least 1000 locations. The number of columns associated with a particular memory segment should be at least equal to the number of columns associated with a particular section of the cylinder of FIG. 8.

If a camera scans in a horizontal direction, sequential pixels are written in adjacent columns, but possibly different rows, of a particular memory segment by simply changing an offset to a counter generated address. The overall write address is generated by adding the offset to the counter's output. This offset is changed at the rate in which the horizontally scanned pixels are received. After a horizontal scan is completed, the counter is incremented and once again the offsets are changed at the horizontal scan rate. As a result, when addressing a particular segment of memory during a write cycle, the columns are addressed by changing the offset at the horizontal pixel scan rate, and incrementing the counter at the vertical scan rate. This type of addressing scheme is used for accessing columns within each memory segment. When addressing different memory segments during a write cycle, a write segment offset is added to the sum of the counter output and the column offset. The write segment offset permits addressing memory segments 230, 232, 234, and 236. The segment offset is changed at the same rate as mux 170 is switched.

Pixel data is read from memory 172 in a similar fashion. The sum of a counter output and two sets of offsets are used to generate a read address. Once an initial starting column has been picked, the read address is generated by switching a read column offset at a rate that is equal to the horizontal scan rate of a video display. After reading one horizontal scans worth of data, the read counter is incremented and the read column offsets are changed at a rate equal to the horizontal scan rate of the display. As a result, the offset addresses are changing at the display's horizontal display rate and the counter is incremented at a rate equal to the vertical scan rate of a display. It is possible to read data out at a rate faster or slower than required by the video display; however, if read out faster, a buffer memory should be used, if read out slower the video display may appear choppy to the viewer.

It should be noted that the cylindrical arrangement of pixels of FIG. 8 is typically displayed on a flat or nearly flat display. As a result, the image may be displayed by compensating for converting between a cylindrical surface and a flat surface. This may be carried out using a simple conversion algorithm within a common digital signal processing integrated circuit. Methods for these types of conversions are well known in the art and can be found in "A Guided Tour of Computer Vision, Vishvjit S. Nalwa, Addison-Wesley Publishing Co., Reading, Mass., 1993". It is also possible to carry out the conversion using a very high resolution display.

It should be noted that if the view selected by a user corresponds exactly to the view of a particular camera, such as camera 52, columns 240–248 are read from memory 170. Column 240 is the first column in segment 232 and column 248 is the last column in segment 232. If the user decides to move the view in a counter-clockwise direction, the start column will shift to the right so that the read operation begins at column 246 and ends at column 250. It should be noted that column 246 is the second column associated with memory segment 232 which has the pixel data from camera 52, and that column 250 is the first column of pixel data associated with camera 56. As the user shifts the view, the starting column shifts in relationship to the user's commands. For example, if the user indicates that the view should shift in a counter-clockwise direction, the start column of FIG. 9 moves to the right, similarly, if the viewer indicates that the view should shift in a clockwise direction, the start column shifts to the left. As before, columns are addressed by using offsets, if the offsets involve moving between memory segments, a read segment offset is added to the sum of the column offset and counter output.

Figure 10:
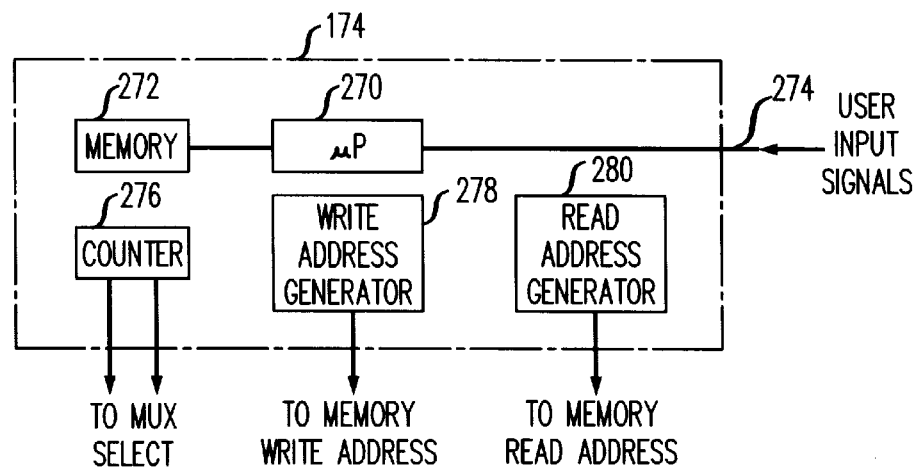
FIG. 10 is a block diagram of the controller of FIG. 7.

FIG. 10 illustrates a block diagram of controller 174. Controller 174 includes microprocessor 270 and memory 272. Memory 272 includes RAM and ROM. Processor 270 receives commands on line 274 from user input device 180. Microprocessor 270 controls start, stop and reset of counter 276. Counter 276 controls the select lines of mux 170. Counter 276 counts at a rate that is four times the horizontal scan rate of the cameras. Write address generator 278 provides write addressing for memory 172. Write address generator 278 includes a counter, register for storing offsets and adder for adding the offsets and counter output. Microprocessor 270 controls the offset selection and the counters used by write address generator 278. The write addresses are formed as described with regard to FIG. 9. Read address generator 280 provides read addresses to memory 172. Read address generator 280 includes a counter, register for storing offsets and adder for adding the offsets and counter output. As with write address generator 278, microprocessor 270 controls the offset selection and the counters of read address generator 280. Microprocessor 270 also controls the starting column used by the counters based on inputs provided on line 274 from user input 180.

The write and read addresses are provided to memory 172 separately if memory 172 is implemented using a two port memory. If memory 172 is implemented with a single port memory, the write and read addresses are multiplexed to memory 172.

Figure 11:
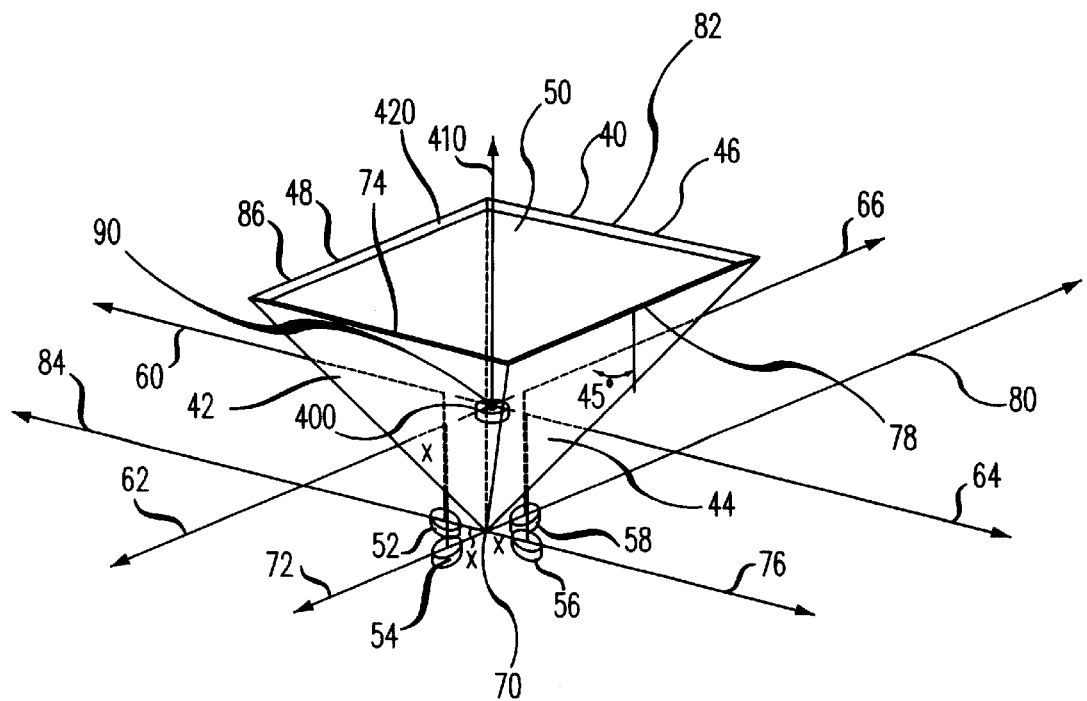
FIG. 11 illustrates the viewing system of FIG. 2 with a fifth camera.

FIG. 11 illustrates the viewing system of FIG. 2 with a fifth camera. Camera or image gathering device 400 is located in pyramid 40 with the optical center of camera 400 located at, or nearly at, virtual optical center 90. Camera 400 views objects in the direction of arrow 410. The resulting view coupled with the views of the remaining four cameras, provides a nearly spherical view. If the cameras of FIG. 11 are replaced with image producing devices, the nearly spherical viewing system becomes a nearly spherical projection system. It should be noted, that a camera or projection device, may be placed at the virtual optical center of viewing/projection devices having pyramids with three, four or more sides. It should also be noted that base edges 420 of the reflective surfaces should be beveled to avoid undesirable obstruction of camera 400's field of view. It is also possible to avoid undesirable image artifacts from base edges 420 by moving camera or image processing device 400. Device 400 should be moved so that device 400's optical center is positioned away from virtual optical center 90 in the direction of arrow 410. Device 400's optical center should be positioned so that the device's used field of view does not include edges 420.

Figure 12:
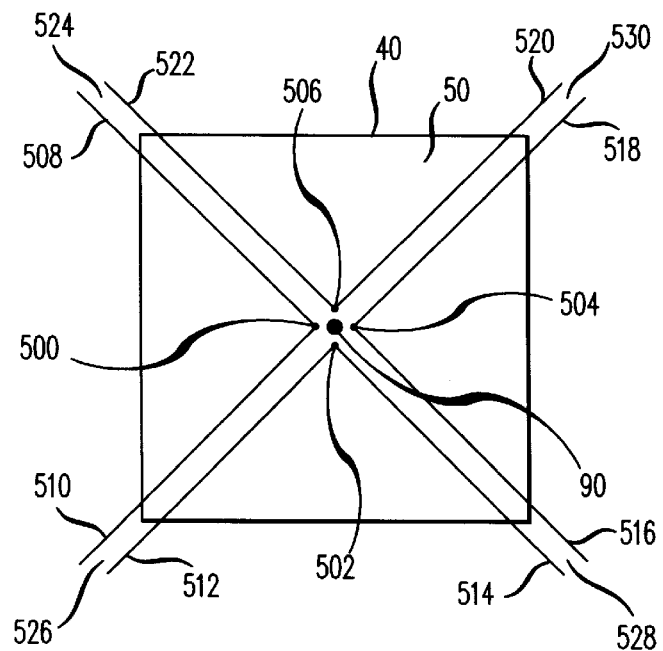
FIG. 12 illustrates a top view of the pyramid of FIG. 2 with displaced virtual optical centers.

FIG. 12 illustrates a top view of the pyramid of FIG. 2. In reference to FIG. 2, camera 52, 54, 56, and 58 have been moved upward in the direction of base 50. As a result, virtual optical centers 500, 502, 504 and 506, which correspond to cameras 52, 54, 56 and 58, respectively, are moved away from virtual optical center 90. It is desirable to move the virtual optical centers so that camera 52 captures an image between lines 508 and 510 that are unaffected by an edge of the pyramid, camera 54 captures an image between lines 512 and 514 that are unaffected by an edge of the pyramid, camera 56 captures an image between lines 516 and 518 that are unaffected by an edge of the pyramid, and camera 58 captures an image between lines 520 and 522 that are unaffected by an edge of the pyramid. This results in the cameras not capturing images distorted by edges of the pyramid from narrow planar shaped regions. In particular, planar regions 524, 526, 528, and 530 are not used and form blind regions. This offers the advantage of removing image regions that are distorted by the edges of the reflective pyramid. Eliminating these portions of the fields of view alleviates the need to provide image processing that compensates for image artifacts at the edges. It is desirable to keep virtual optical centers 500, 502, 504, and 506 closely clustered so that planes 524, 526, 528, and 530 are only as thin as necessary to avoid edge artifacts. By maintaining such thin planes, the need to process the images at their common boundaries is removed while minimizing the noticeable effect seen by a user.

Figure 13:
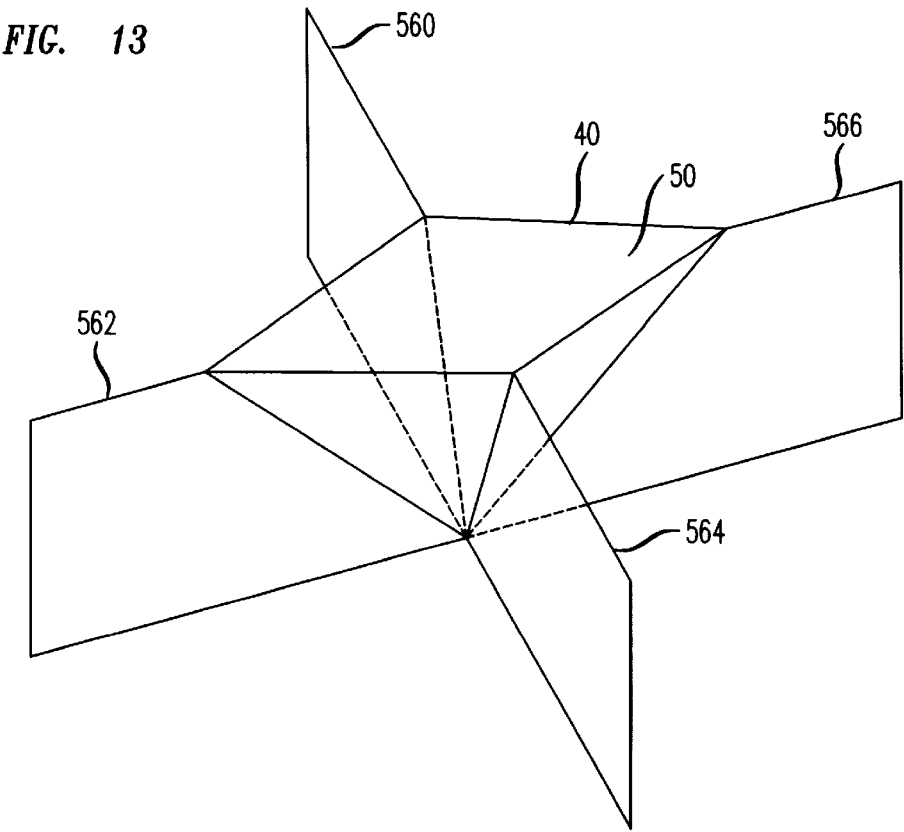
FIG. 13 illustrates the pyramid of FIG. 12 with shades positioned in blind regions.

FIG. 13 illustrates the pyramid of FIG. 12 with shades 560, 562, 564, and 566 positioned in planar regions 524, 526, 528, and 530, respectively. The shades reduce the amount of unwanted light that enters the cameras. Similar shades may be placed in blind regions between device 400 and one or more of the other image processing devices. It is also possible to place a shade on base 50 with the edges of the shade extending beyond the edges of the base to reduce the amount of unwanted light that enters cameras 52, 54, 56, and 58 from sources behind base 50.

Figure 14:
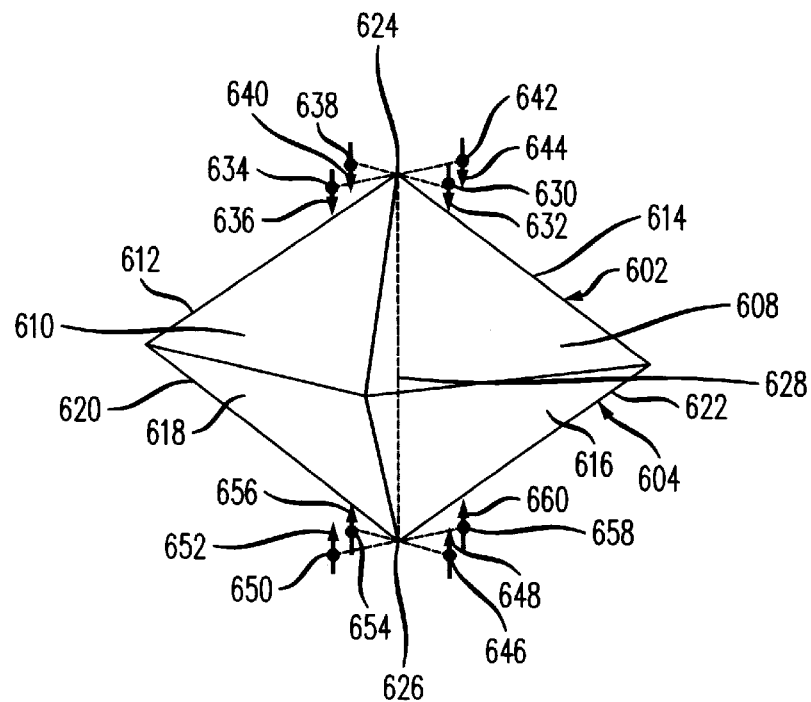
FIG. 14 illustrates a panoramic viewer using pyramids stacked base to base.

FIG. 14 illustrates reflective pyramids 602 and 604 arranged in a base-to-base configuration. The bases may be in contact with each other or spaced apart. Reflected pyramids 602 and 604 each have four reflective side facets. Pyramid 602 has reflective side facets 608, 610, 612, and 614. Reflective pyramid 604 has reflective sides 616, 618, 620, and 622. Pyramid 602 includes vertex 624 and pyramid 604 includes vertex 626. Vertices 624 and 626 are on a line 628 that is perpendicular to the base of each pyramid. Each pyramid has four image processing devices such as cameras with a field of view being redirected by a reflective surface. With regard to pyramid 602, a camera with an optical center positioned at point 630 has a field of view in the direction of arrow 632 where that field of view is redirected by reflective surface 608. A second camera with an optical center at point 634 has a field of view in the direction of arrow 636 which is redirected by reflective surface 610. A third camera with an optical center at point 638 has a field of view in the direction of arrow 640 which is redirected by reflective surface 612. A fourth camera with an optical center at point 642 has a field of view in the direction of arrow 644 which is redirected by reflective surface 614. Regarding reflective pyramid 604, a first camera with an optical center at point 646 has a field of view in the direction of arrow 648 which is redirected by reflective surface 616. A second camera with an optical center at point 650 has a field of view in the direction of arrow 652 which is redirected by surface 618. A third camera with an optical center at point 654 has a field of view in the direction of arrow 656 which is redirected by reflective surface 620. A fourth camera with an optical center at point 658 has a field of view in the direction of arrow 660 which is redirected by reflective surface 622. The cameras associated with each of the pyramids are positioned in a way similar to how the cameras were positioned with regard to FIGS. 2, 3, 4, 11, and 12 so that each set of four cameras shares a common virtual optical center or have closely clustered virtual optical centers within their associated pyramid. Each set of cameras may also have offset virtual optical centers within their associated pyramid. The cameras may be positioned so that the cameras associated with each pyramid share a common virtual optical center along line 628 where the bases of the two pyramids meet. It is also possible to position the cameras so that their offset virtual optical center are clustered about a point on line 628 where the bases of the two pyramids meet.

The structure of FIG. 14 increases the vertical fields of view as compared to the viewers discussed with regard to FIGS. 2, 3, and 4. The viewer of FIG. 14 increases the vertical field of view by using two cameras rather than one camera for the same or nearly the same horizontal field of view. It should be noted that a projector may be constructed by replacing the cameras with image producing devices. It should also be noted that reflective pyramids 602 and 604 may be rotationally misaligned with respect to each other. This misaligned relationship is obtained by rotating one or both of the pyramids about an axis that passes through the vertices of both pyramids. For example, the axis may be co-linear with line 628. As a result of this rotation, the side edges of the reflective side facets of pyramid 602 will not align with the side edges of the reflective side facets of pyramid 604.

Although a pyramid configuration has been discussed in this example, different planar mirror geometries may be used to redirect fields of view so that the cameras have virtual optical centers that are substantially co-located. For example, solid, hollow or partial polyhedrons may be used. Additionally, in the case of a pyramid configuration the base and vertex do not have to be physically present and can be thought of as conceptual aids such as a base plane or end and vertex point or end.

Figure 15:
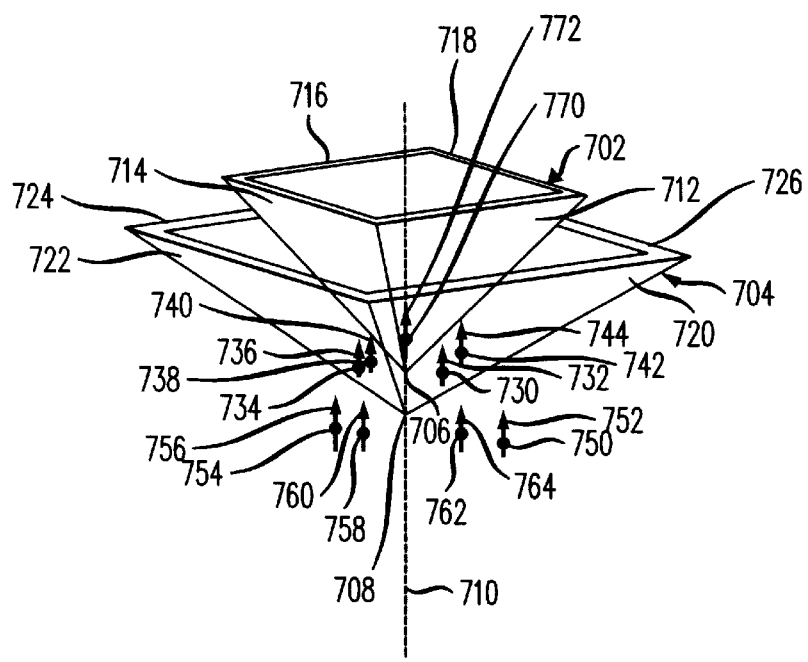
FIG. 15 illustrates a panoramic viewer using nested pyramids.

FIG. 15 illustrates two reflective pyramids. Reflective pyramid 702 is nested within reflective pyramid 704. It should be noted that more than two reflective pyramids may be nested. For example, another reflective pyramid may be nested within reflective pyramid 702 and yet another reflective pyramid may be nested within the pyramid that is nested within pyramid 702. Vertex 706 of pyramid 702 and vertex 708 of pyramid 704 are on a line 710 which is perpendicular to the bases of both pyramids. Once again, each pyramid includes four image processing devices such as cameras each with a field of view that is redirected by a reflective surface of their associated pyramid. Pyramid 702 includes reflective side facets 712, 714, 716, and 718. Reflective pyramid 704 includes reflective side facets 720, 722, 724, and 726. Four cameras are positioned so that their field of view is redirected by the reflective surfaces of pyramid 702. A first camera with an optical center at point 730 and a field of view in direction of arrow 732 has its field of view redirected by reflective surface 712. A second camera with an optical center at point 734 and a field of view in the direction of arrow 736 has its field of view redirected by reflective surface 714. A third camera with an optical center at point 738 and a field of view in the direction of arrow 740 has its field of view redirected by reflective surface 716. A fourth camera with an optical center at point 742 and a field of view in the direction of arrow 744 has its field of view redirected by reflective surface 718. It should be noted that pyramid 702 and its associated cameras are positioned so that the field of view of the cameras is not obstructed by pyramid 704. This is accomplished by allowing pyramid 702 to extend beyond the base of pyramid 704. Regarding pyramid 704, a first camera with an optical center at point 750 and a field of view in the direction of arrow 752 has its field of view redirected by reflective surface 720. A second camera with an optical center at point 754 and a field of view in the direction of arrow 756 has its field of view redirected by reflective surface 722. A third camera with an optical center at point 758 and a field of view in the direction of arrow 760 has its field of view redirected by reflective surface 724. A fourth camera with an optical center at point 762 and a field of view in the direction of arrow 764 has its field of view redirected by reflective surface 726. The cameras associated with each of the pyramids are positioned in accordance with the positioning illustrated with FIGS. 2, 3, 4, 11, and 12 so that the eight cameras share a virtual optical center at position 770 or have closely clustered virtual optical centers within pyramid 702. Each set of cameras may also have offset virtual optical centers within pyramid 702.

The panoramic viewer of FIG. 15 can be provided with a ninth camera having an optical center at point 770 and a field of view in the direction of arrow 772 to provide a viewer with a partially-spherical view. The camera having an optical center at position 770 may use a wide-angle lens to provide a broader view.

Figure 16:
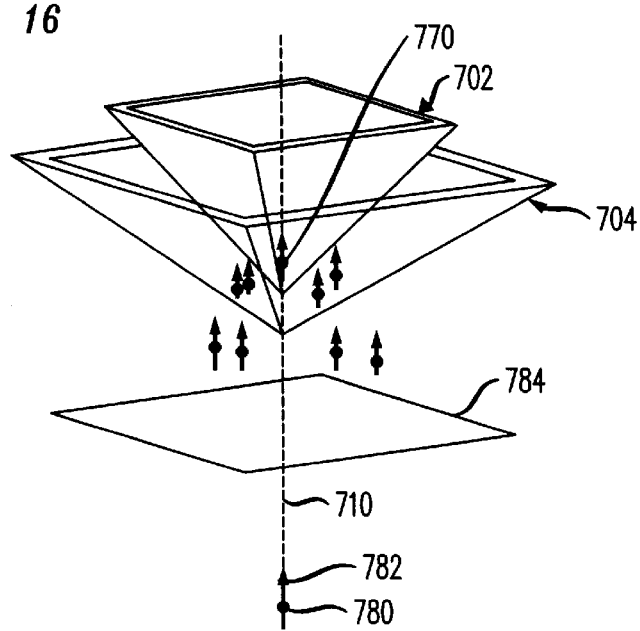
FIG. 16 illustrates a spherical viewer using nested pyramids.

FIG. 16 illustrates the partially-spherical viewer of FIG. 15 with an additional camera having an optical center at point 780 and a field of view in the direction of arrow 782 where that field of view is redirected by planar mirror 784. It should be noted that optical center 780 is on line 710 which passes through the vertices of pyramid 702 and 704 as well as virtual optical center 770. It should also be noted that point 780 is placed a distance away from planar mirror 784 that is equal or nearly equal to the distance between planar mirror 784 and virtual optical center 770. By placing a camera with an optical center at point 780 and having the field of view redirected by planar mirror 784, the partially-spherical viewer of FIG. 15 becomes a spherical viewer. In order to increase the field of view of the camera positioned with an optical center at point 780, the camera may be provided with a wide-angle lens. It should also be noted that planar mirror 784 may be replaced with a curved mirror to provide a wider field of view for the camera positioned at point 780 and minimize the need for a wide-angle lens.

Although a pyramid configuration has been discussed in this example, different planar mirror geometries may be used to redirect fields of view so that the cameras have virtual optical centers that are substantially co-located. For example, solid, hollow or partial polyhedrons may be used. Additionally, in the case of a pyramid configuration the base and vertex do not have to be physically present and can be thought of as conceptual aids such as a base plane or end and vertex point or end.

Regarding FIGS. 15 and 16, it should be noted that a projector may be constructed by replacing the cameras with image producing devices. It should also be noted that reflective pyramids 702 and 704 may be rotationally misaligned with respect to each other. This misaligned relationship is obtained by rotating one or both of the pyramids about an axis that passes through the vertices of both pyramids. For example, the axis may be co-linear with line 710. As a result of this rotation, the side edges of the reflective side facets of pyramid 702 will not align with the side edges of the reflective side facets of pyramid 704.

Figure 17:
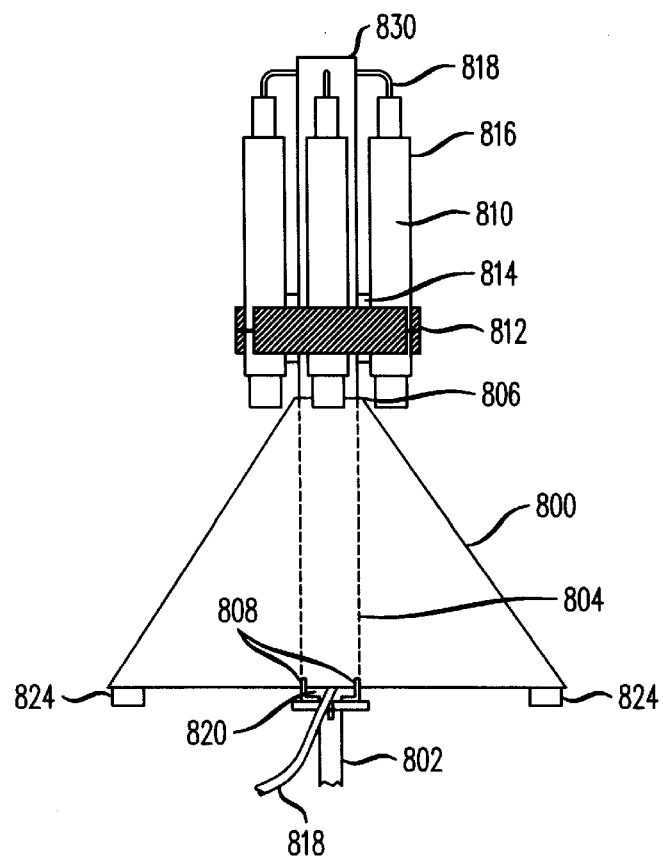
FIG. 17 illustrates a stand used to support a panoramic viewer.

FIG. 17 illustrates a stand used to support a panoramic viewer. Reflective pyramid 800 is mounted to stand or post 802 using a support member such as hollow tube 804. The pyramid is secured to hollow tube 804 at vertex end 806. The hollow tube is secured to stand 802 by angle brackets 808. Hollow tube 804 extends beyond vertex end 806 so that cameras 810 may be supported by tube 804. The cameras are mounted to tube 804 by strap or belt 812 which presses cameras 810 against spacer 814. The pressure provided by clamp or strap 812 provides friction between camera 810, spacer 814, and the outer surface of tube 804 and thereby mounts cameras 810 to tube 804 in a secure fashion. It is also possible to provide a second strap and associated spacers at end-section 816 of cameras 810. Video and power connections to cameras 810 are provided by cables 818 which are fed through hollow tube 804 and out through space 820 which is between post 802 and the base of pyramid 800. It should be noted that hollow tube 804 may be replaced with a solid support member; however, a hollow support member provides a convenient path for routing cables. Feeding the cables through tube 804 prevents the cables from entering the field of view of cameras 810. Rubber stands or feet 824 are provided at the base end of pyramid 800. These stands may be used in place of post 802 to provide flexibility in application where the user does not want to use post 802.

It is also possible to invert the viewer of FIG. 17 so that the viewer is supported by end 830 of tube 804. In this configuration cables 818 will simply be passed out through an opening at end 830 of tube 804. In this configuration tube 804 is mounted to post 802 at end 830 using angle brackets similar to angle brackets 808. It is also possible to mount end 830 to any convenient structure to support the panoramic viewer.

The stand of FIG. 17 is applicable to the viewer of FIGS. 14, 15, and 16. As discussed with regard to FIG. 17, the viewer is mounted to a hollow tube passing through the vertices or vertex ends of both pyramids.

CALIBRATION

Figure 18:
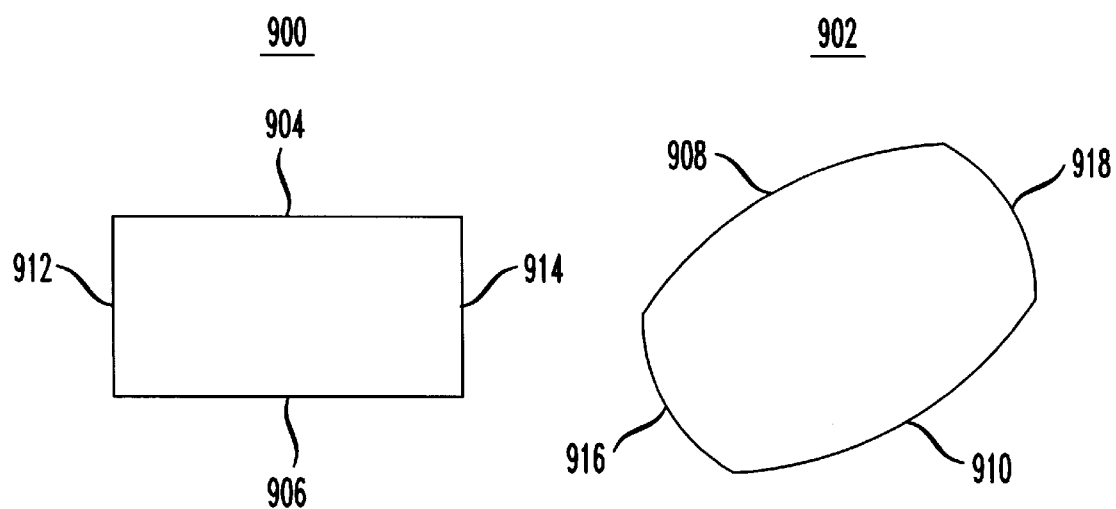
FIG. 18 illustrate two types of distortion.

A higher quality image may be produced by calibrating the camera system. Calibration may be used to determine image mapping functions (which may be implemented as look up tables) that compensate for different types of image distortion. For example, the mapping functions may be used to correct barrel distortion which is a distortion introduced by a wide-angle lens. Mapping functions may also be used to correct other types of distortions such as a rotational distortion resulting from misaligned charged coupled devices within the cameras. FIG. 18 illustrates a combination of barrel distortion and rotational distortion, where the distortion results in rectangular object 900 appearing as distorted image 902. Distorted image 902 is rotated with respect to undistorted object 900 and a barrel distortion is seen where edges 904 and 906 of rectangular object 900 appear as edges 908 and 910 of image 902, and where edges 912 and 914 appear as edges 916 and 918, respectively. This distortion may be corrected using mapping functions that are determined by calibrating the camera system.

Figure 19:
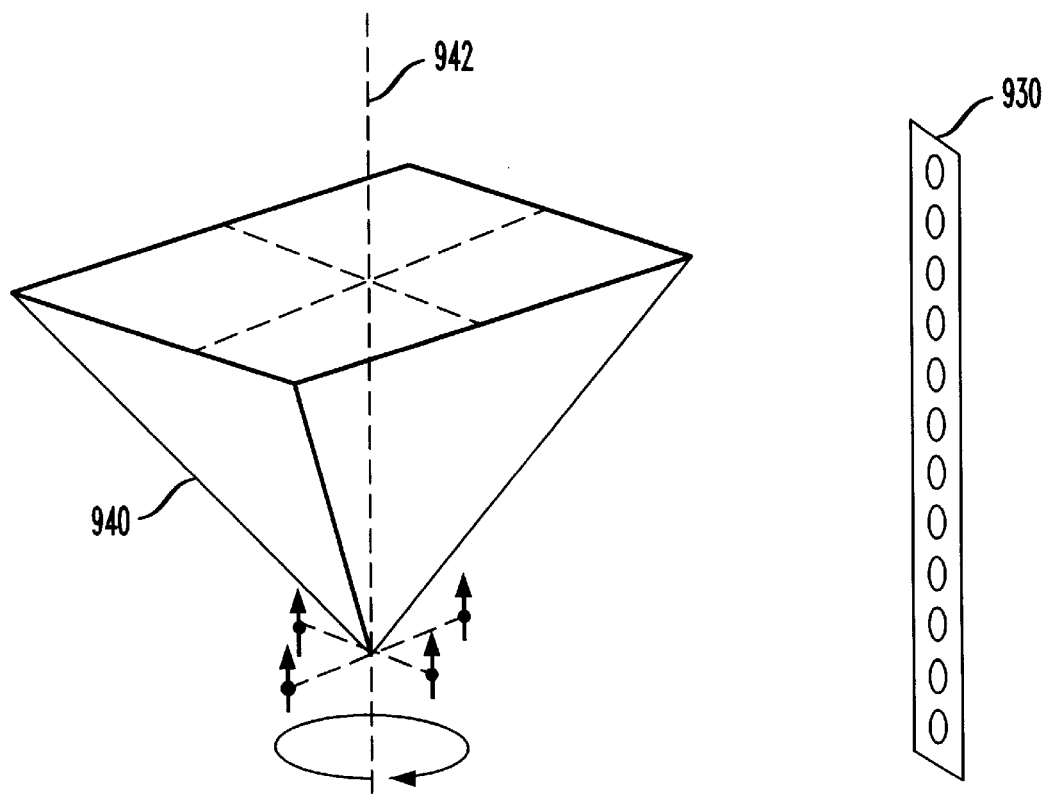
FIG. 19 illustrates a calibration process.

FIG. 19 illustrates a process for calibrating the camera system. A vertical column of equally spaced elliptical dots 930 is placed in a fixed position. The dots are white on a black background where the major axis of the elliptical dot is in the vertical direction. Panoramic camera 940 is then rotated in small discrete steps about an axis 942 passing through the virtual optical center of the panoramic camera. At each step, the distorted image of the column of elliptical dots is viewed and a mapping function for that data is determined to remove the distortion. This function maps the image such that the distorted image of each vertical column of equally spaced dots is a vertical column of equally spaced dots in the mapped image. Note that although the images of the white dots have black gaps between them, the mapping function is computed to apply to every image pixel (including the pixels between the white dots) through interpolation. An image mapping function is determined at each of the discrete steps as the camera is rotated, the union of these mapping functions is combinable into a 2-D to 2-D mapping that ensures not only that each vertical column of equally spaced dots appears as a vertical column of equally spaced dots in the image, but also that these columns are spaced horizontally in proportion to the angular rotation between their image acquisitions, the latter providing a cylindrical (rather than flat) image of the scene.

Figure 20:
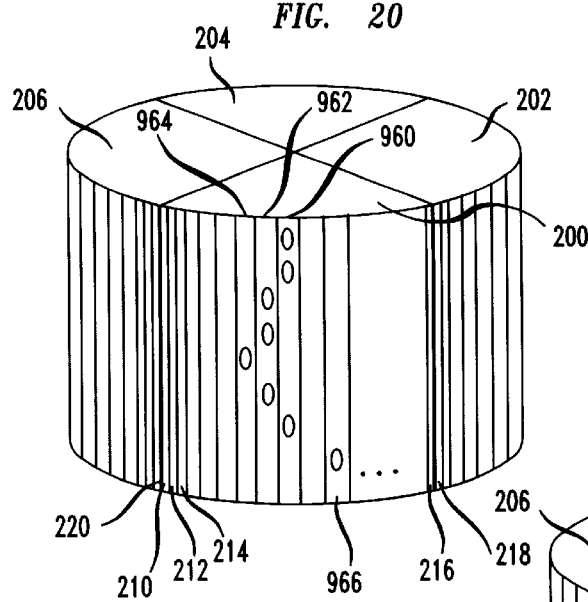
FIG. 20 illustrates the association between data received from the cameras and the view presented to the user with distortion.
Figure 22:
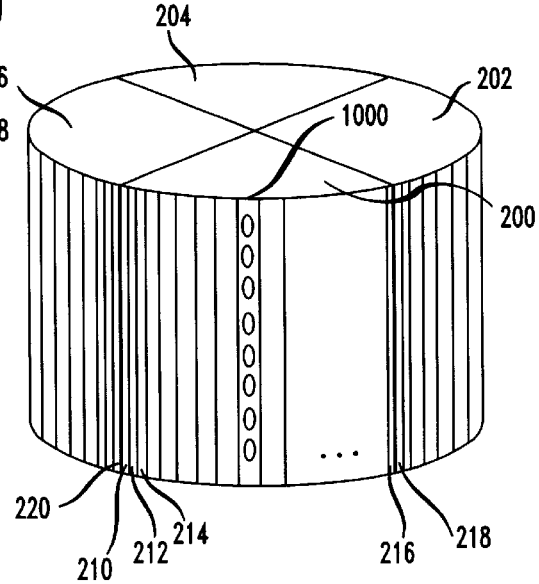
FIG. 22 illustrates how mapped image data is stored.
Figure 21:
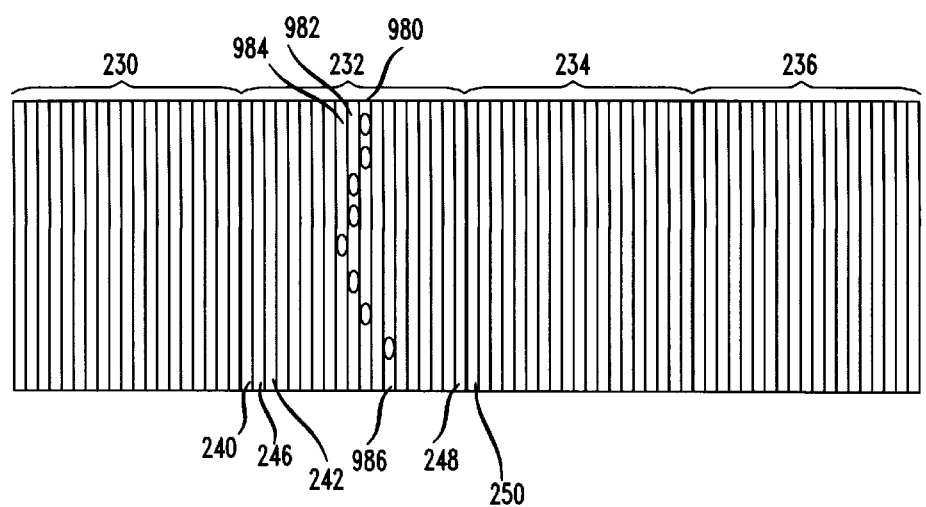
FIG. 21 illustrates how distorted image data is stored.

FIGS. 20 and 21 illustrate how the data representative of the vertical column of elliptical dots is represented as a result of distortion. FIG. 20 is similar to FIG. 8 in that it illustrates the relationship between the data provided by the cameras and the view available to the user. It should be noted that the vertical column of dots is not in a single column of FIG. 20 as a result of the distortion. The distortion has caused the dots to occupy columns 960, 962, 964 and 966, rather than just a single column. FIG. 21 is similar to FIG. 9 in that it illustrates how image data is stored. When the distorted image data is stored in memory as represented in FIG. 21, the data representative of the dots also occupies several columns where columns 980, 982, 984 and 986 correspond to the columns 960, 962, 964 and 966 of FIG. 20, respectively. The image mapping function determined during the calibration phase is used to correct for this distortion when the data is read from the memory represented in FIG. 21. The corrected or undistorted image data may then be displayed to the user or written to a memory used to store data representative of the undistorted image. FIG. 22 illustrates the relationship between the data read from the memory of FIG. 21 and the undistorted view made available to a user. For example, the mapping function associated with column 1000 specifies that when reading data for use in the uppermost portion of column 1000, data is read from column 980 and when reading data for use in the portion of column 1000 just below, data is read from column 982. The mapping function also specifies that when reading data for use in the middle portion of column 1000, data is read from column 984. Moving further down column 1000, data is then read from column 982, then column 980, and eventually from column 986 when data for use at the bottom of column 1000 is retrieved. As a result of reading data, as specified by the mapping function, the column of data will appear vertical to a user viewing a display. FIG. 22 illustrates that the data retrieved from the memory of FIG. 21 now appears as a vertical column where the distortion is no longer evident. A similar mapping function, as determined during calibration, is used for each column of FIG. 22 to produce an undistorted image for display. It should be noted that multiple discrete rotational steps used to calibrate the panoramic camera could be substituted by a group of several columns illustrated in FIG. 22.

Color and intensity calibration may also be carried out using a procedure similar to the procedure illustrated in FIG. 19. In this case, column 930 of elliptical dots is replaced by a known color pattern. The panoramic camera is then rotated so that each camera captures an image of the color pattern. Several color patterns (such as various shades of red, green, blue, and gray) could be used one by one. Then on a pixel-by-pixel basis, the data from each camera is adjusted to correct any red, green, or blue distortion so that the produced image has a color pattern that closely matches the calibration color pattern. Additionally, the intensity of each pixel from each camera is adjusted so that there is relatively uniform intensity and color within a single camera's image and between the images of the multiple cameras when viewing a scene with constant color and brightness. As discussed with regard to the mapping function, the pixel-by-pixel adjustment may be stored in a table. A less precise, but simpler method of color and intensity calculation may be used. This method simply involves manually adjusting the color and intensity controls of each camera to get correct color and intensity when viewing a scene with a particular color and intensity. It should be noted that by using this method, all of the pixels of a particular camera receive the same adjustments.

Figure 23:
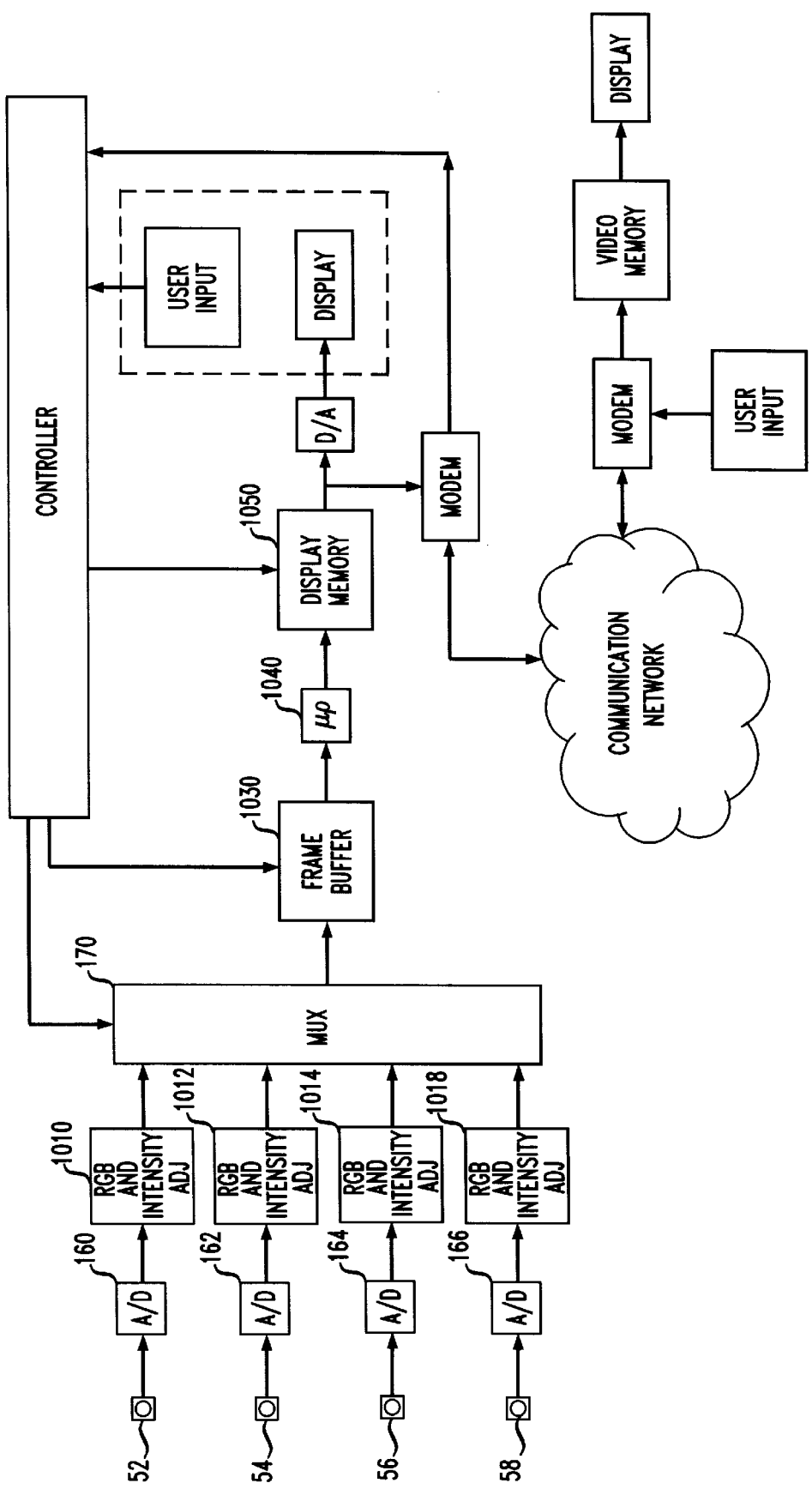
FIG. 23 is a block diagram of a panoramic camera system where image mapping is used.

FIG. 23 illustrates a panoramic camera system where calibration based image mapping correction is used. FIG. 23 is similar to FIG. 7; however, it should be noted that a frame buffer memory and an additional microprocessor have been included. Cameras 52, 54, 56, and 58 gather image data and then pass the data to analog-to-digital converters 160, 162, 164, and 166, respectively. The output of the analog-to-digital converters are then passed through red, green, blue, and intensity adjustment units 1010, 1012, 1014, and 1018. It is possible to place these units before the analog/digital converters, if the adjustment units are analog units. Additionally, it is also possible to use cameras that have the adjustment units built into each camera. In any case, the adjustment units are programmed or set to adjust the color and intensity as determined by the calculation procedures. Each of these units adjust the red, green, and blue levels and the overall levels of the signals from the analog-to-digital converter. It should be noted that if cameras 52 through 58 are color cameras, analog-to-digital converters 160 to 166 typically receive three signals and output three signals, where each pair of input and output signals corresponds to one of the colors red, green, and blue. Units 1010 through 1016 simply adjust the relative amplitudes of the red, green, and blue signals in accordance with the settings determined during the calibration procedure. Each of units 1010 through 1018 also adjust the overall amplitude of the red, green, and blue signals in accordance with the overall intensity calibration settings. The outputs of the red, green, and blue intensity adjustments are then passed through a multiplexer as discussed in FIG. 7, and are passed to frame buffer memory 1030. It is also possible to replace frame buffer 1030 with an individual frame buffer for each of red, green, blue and intensity units 1010, 1012, 1014, and 1018. The outputs of each of the individual frame buffer may then be passed to microprocessor 1030 via multiplexer 170.

Frame buffer memory 1030 is operated in a fashion similar to memory 172 of FIG. 7 and stores the data representing the distorted images as was discussed in reference to FIG. 21. Microprocessor 1040 then reads the data from frame buffer memory 1030 using the mapping functions determined during the calibration procedure and then writes the data into display memory 1050. Recalling the discussion associated with FIG. 22, the data representing undistorted images is then stored in memory 1050 for retrieval by the users. The users can retrieve the data as is discussed in reference to FIG. 7 where the data read out is determined based on a user's input. It is also possible for the entire contents of display memory to be made available to each user. The data may be communicated to each user through a communication network such as a telephone network or a data network, or it may be directly communicated to the user via a dedicated wired or wireless communication path. The user then may use a digital-to-analog converter to convert the data into an analog format that may be displayed for the user or the user may use the digital data directly and forego the use of a digital-to-analog converter.

Figure 24:
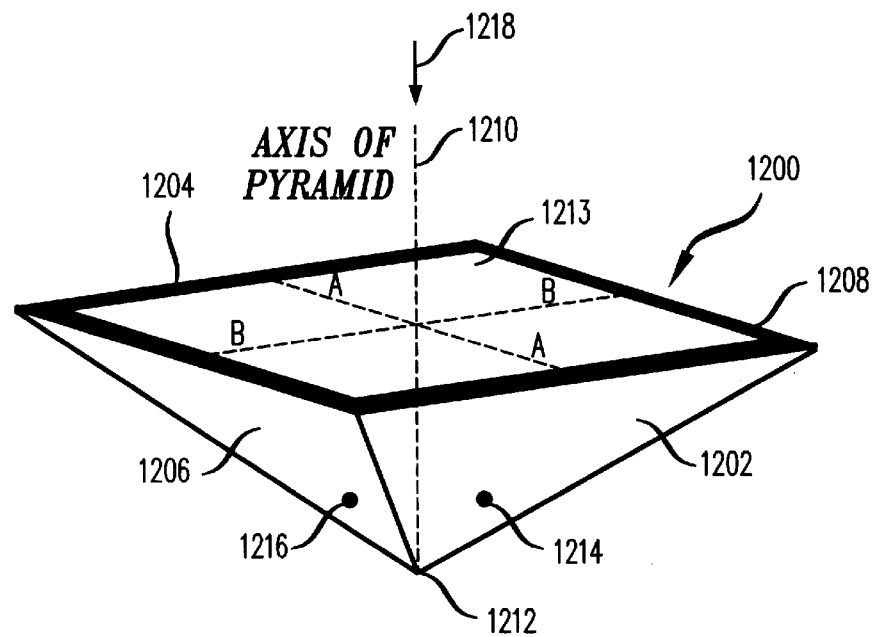
FIG. 24 illustrates a reflective pyramid with two virtual optical centers.

FIG. 24 illustrates reflective pyramid 1200 with reflective surfaces 1202, 1204, 1206 and 1208. Line 1210 is the axis of the pyramid which passes through vertex 1212 of pyramid 1200 and is perpendicular to base 1213 of the pyramid. Pyramid 1200 is similar to the pyramid discussed with regard to FIGS. 2 and 3. In this case, however, rather than a single virtual optical center, two virtual optical centers are provided. Virtual optical centers 1214 and 1216 are used to provide a stereo panoramic viewer. In order to closely mimic normal human vision, it is desirable that virtual optical centers 1214 and 1216 be spaced apart horizontally a distance that is approximately equal to the typical distance between a person's eyes. Each virtual optical center 1214 and 1216 is associated with a set of cameras where each camera in the set has its field of view redirected by a reflective surface of the pyramid so that portions of the redirected fields of view are substantially contiguous. The cameras are arranged and supported as discussed with regard to FIGS. 2, 3 and 17, however, the cameras are arranged so that each set of cameras has a virtual optical center that is displaced from the center of the pyramid. The cameras for each optical center are arranged similar to the way that cameras were arranged in regard to FIGS. 2 and 3, however, the cameras are arranged so that each of the two sets of cameras has a different virtual optical center, where one set of cameras has a virtual optical center at point 1214 and the other set of centers has a virtual optical center at position 1216.

Figure 25:
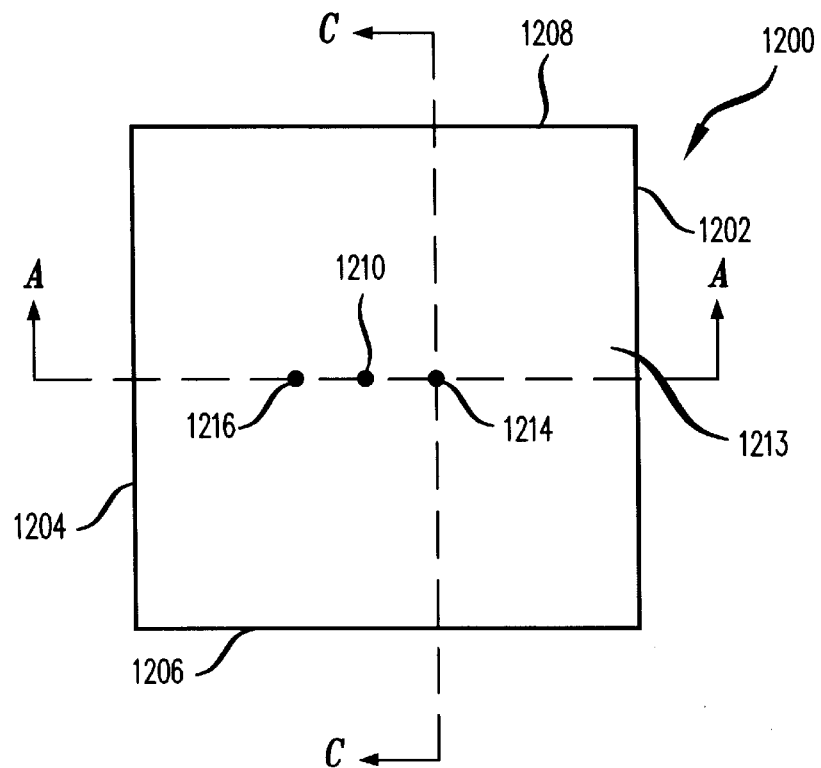
FIG. 25 illustrates the pyramid of FIG. 24 viewed from the base.

FIG. 25 illustrates pyramid 1200 when viewed at the base along axis 1210 and in the direction of arrow 1218 of FIG. 24. It should be noted that virtual optical centers 1214 and 1216 are displaced horizontally from the center axis 1210 with the distance between them approximately equal to the typical distance between a pair of human eyes. In this example, virtual optical centers 1214 and 1216 appear on a line AA that passes through axis 1210.

Figure 26:
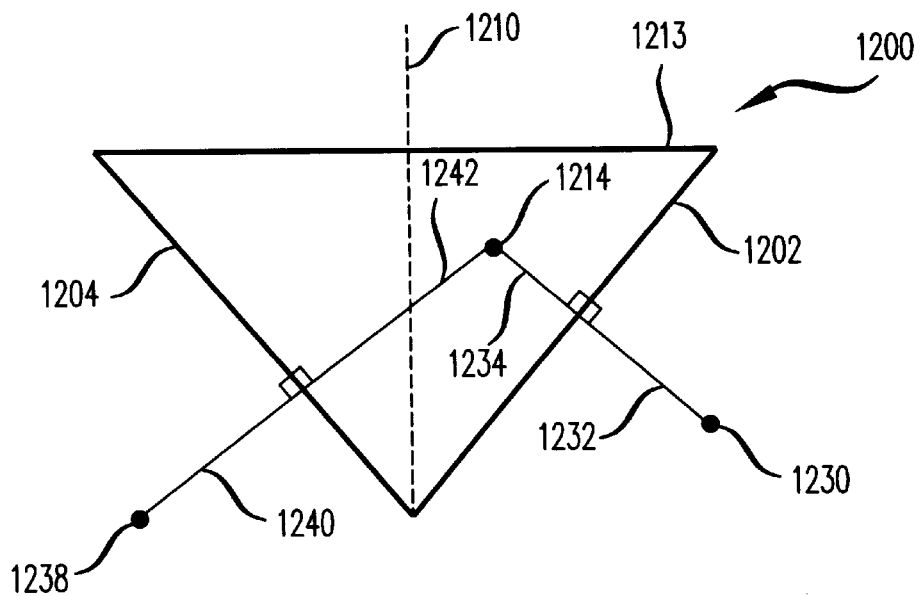
FIG. 26 illustrates a cross section of the pyramid of FIG. 24 taken along line AA.

FIG. 26 illustrates a cross section of pyramid 1200 taken along line AA of FIGS. 24 and 25. For the sake of simplicity, only virtual optical center 1214 is shown; however, the positioning techniques for the cameras associated with virtual optical center 1214 may be used with other displaced virtual optical centers such as virtual optical center 1216. Point 1230 represents the optical center of a camera that has its field of view redirected by reflective surface 1202 of pyramid 1200. Optical center 1230 is positioned so that its perpendicular distance 1232 from reflective surface 1202 is equal to perpendicular distance 1234 which is the perpendicular distance between virtual optical center 1214 and reflective surface 1202. Likewise, point 1238 represents the optical center of a camera that has its field of view redirected by reflective surface 1204. Optical center 1238 is positioned so that its perpendicular distance 1240 from reflective surface 1204 is equal to perpendicular distance 1242 between virtual optical center 1214 and reflective surface 1204.

Figure 27:
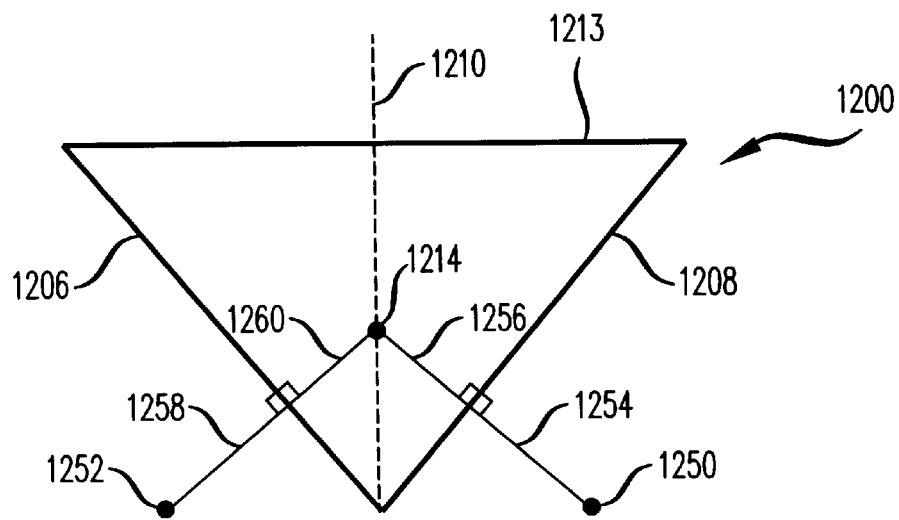
FIG. 27 illustrates a cross section of the pyramid of FIG. 24 taken along line CC of FIG. 25.

FIG. 27 illustrates a cross section of pyramid 1200 cut along line CC of FIG. 25. Point 1250 represents the optical center of a camera whose field of view is redirected by reflective surface 1208. Point 1252 represents the optical center of a camera whose field of view is redirected by reflective surface 1206. Point 1250 is positioned so that its perpendicular distance 1254 from reflective surface 1208 is equal to perpendicular distance 1256 between reflective surface 1208 and virtual optical center 1214. Optical center 1252 is positioned so that its perpendicular distance 1258 from reflective surface 1206 is equal to perpendicular distance 1260 between virtual optical center 1214 and reflective surface 1206.

Figure 28:
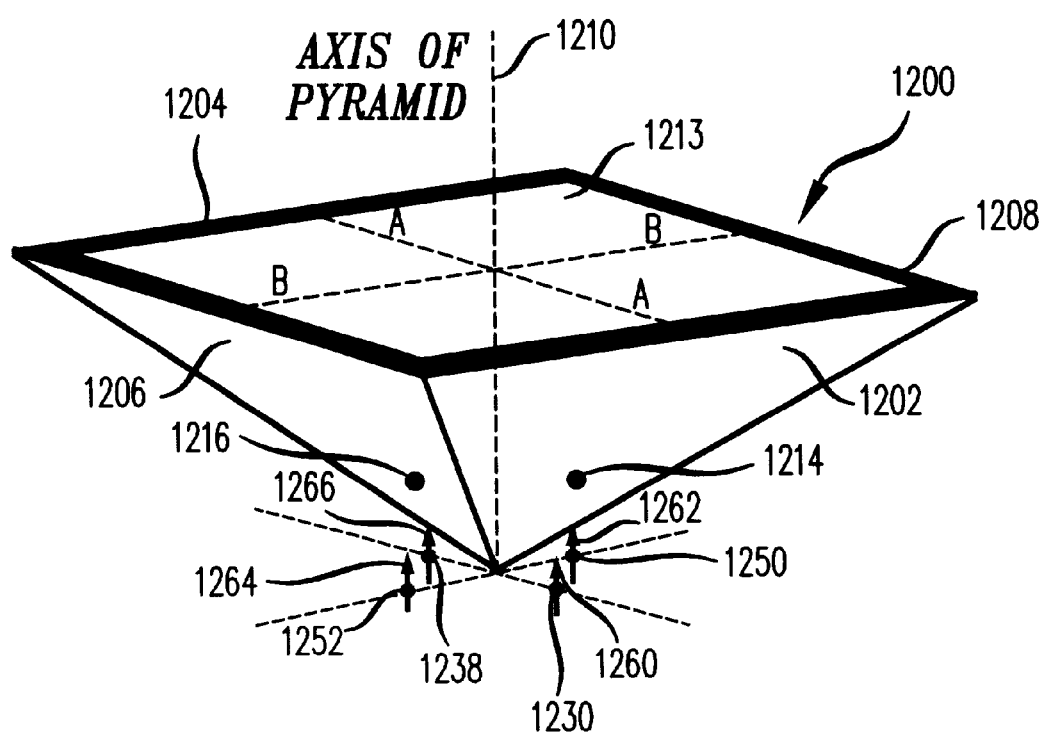
FIG. 28 illustrates the cameras associated with one of the virtual optical centers of the pyramid.

FIG. 28 illustrates the cameras associated with virtual optical center 1214 and are positioned so that the optical center of each camera is arranged in accordance with FIGS. 26 and 27. A camera with an optical center at position 1230 has a field of view in direction of arrow 1260 and the field of view is redirected by reflective surface 1202 so that the virtual optical center for the camera associated with point 1230 is at virtual optical center 1214. A camera with an optical center at position 1250 has a field of view in the direction of arrow 1262 where the field of view is redirected by surface 1208. This results in the camera associated with point 1250 having a virtual optical center at point 1214. Similarly, a camera with an optical center at point 1252 has a field of view in the direction of arrow 1264 where that field of view is redirected by surface 1206. This results in the camera associated with point 1252 having a virtual optical center at point 1214. Likewise, a camera having an optical center at point 1238 with the field of view in the direction of arrow 1266 where that field of view is redirected by surface 1204. This results in the camera associated with position 1238 having a virtual optical center at point 1214. A similar set of cameras may be positioned as was discussed with regard to FIGS. 26 and 27 so that a second virtual optical center may be created at point 1216. The additional cameras associated with virtual optical center 1216 have not been shown for the sake of simplicity.

It should be noted that a complete panoramic image is produced for each of the virtual optical centers 1214 and 1216. The images associated with each of the virtual optical centers are processed as described with regard to FIGS. 7 and 23. In this case, however, when a user requests an image, two images are delivered; preferably one designated left and one designated right where the left image is provided to the left eye of the user and the right image is provided to the right eye of the user. This provides a stereo view that is equivalent to the user viewing the world from inside the pyramid with one eye located at virtual optical center 1214 and the other eye located at virtual optical center 1216. Additionally, it should be noted that the virtual optical center associated with each of the cameras need not be exactly at a single location or point such as virtual optical center 1214. The optical centers may be closely clustered around point 1214 simply due to difficulties with precisely aligning the cameras. Additionally it may be desirable to intentionally cluster the virtual optical centers associated with the cameras around point 1214 so that a set of offset virtual optical centers are produced which will result in blind regions as described with regard to FIG. 12. These blind regions may be used to remove the portions of the images that may be distorted due to the edges of the pyramids where the different reflective surface of the pyramid meet.

Figure 29:
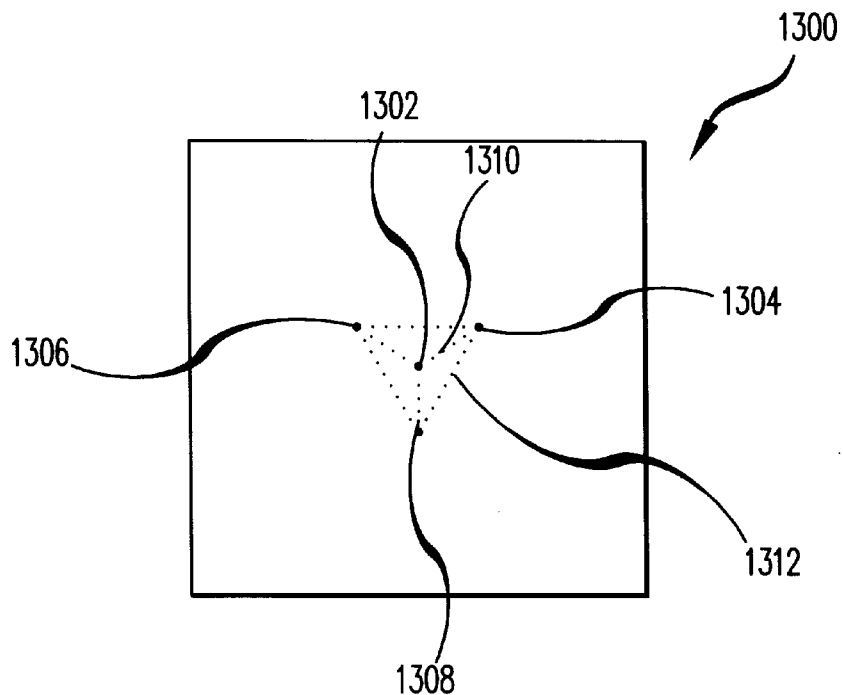
FIG. 29 illustrates a reflective pyramid with three virtual optical centers.

FIG. 29 illustrates reflective pyramid 1300. Reflective pyramid 1300 has axis 1302 which passes through the vertex of the pyramid and is perpendicular to the base of the pyramid. The pyramid is part of a panoramic viewer which has three virtual optical centers 1304, 1306 and 1308. Each of the virtual optical centers has a set of cameras that are positioned in accordance with the discussion of FIGS. 26 and 27. The virtual optical centers are an equal distance 1310 from axis 1302 and are arranged so that they are each a distance 1312 from each other, where the distance 1312 is approximately equal to the typical distance between a person's eyes. This arrangement results in each virtual optical center having associated with it a panoramic view.

Figure 30:
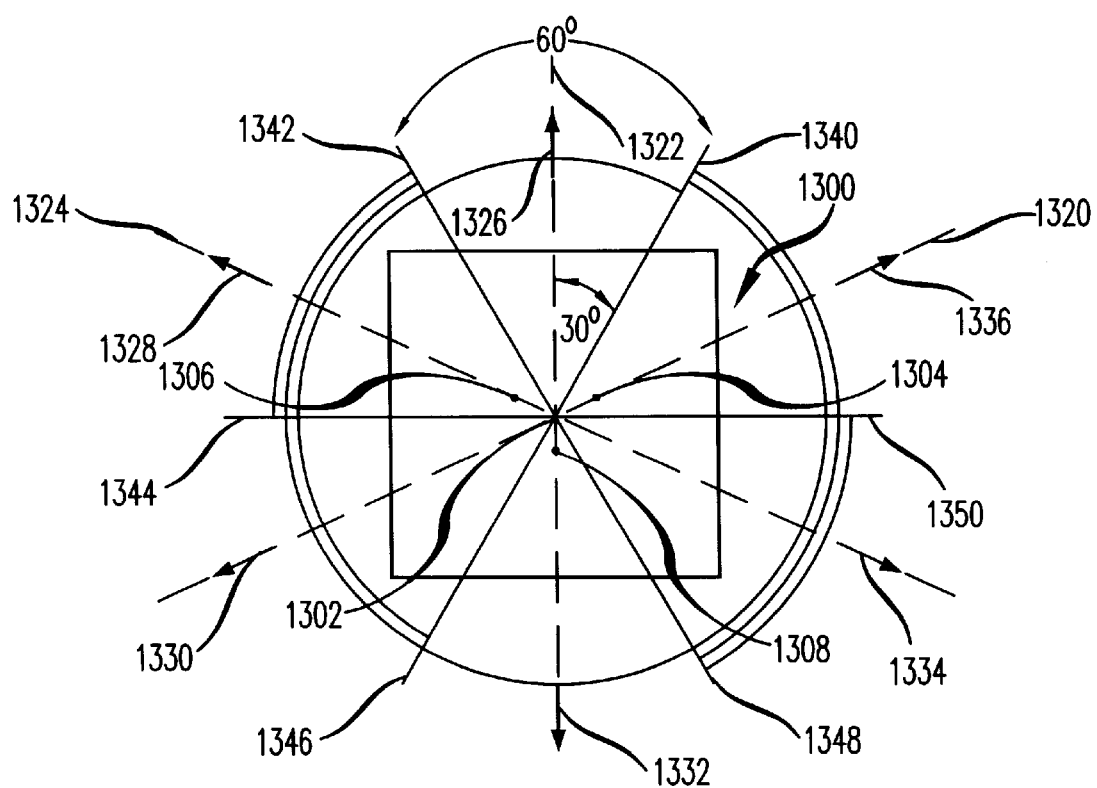
FIG. 30 illustrates using different pairs of virtual optical centers for different viewing directions.

FIG. 30 is also a view of pyramid 1300 looking downward at the base from outside the pyramid. FIG. 30 illustrates which pair of virtual optical centers are used to provide images to a user. The pair of virtual optical centers used depends on which direction the user desires to view. As a reference, lines 1320, 1322 and 1324 are shown. Line 1320 passes through virtual optical center 1304 and axis 1302. Line 1322 passes through virtual optical center 1308 and axis 1302 and similarly line 1324 passes through virtual optical center 1306 and axis 1302. It should be noted that arrow 1326 of line 1322 can be thought of as the center of the view presented by virtual optical centers 1306 and 1304 in the direction of arrow 1326. Additionally, arrow 1328 of line 1324 can be thought of as the center of the view provided by virtual optical centers 1308 and 1304 in the direction of arrow 1328. Arrow 1330 of line 1320 can be thought of as the center of the view provided by virtual optical centers 1306 and 1308 in the direction of arrow 1330. Arrow 1332 of line 1322 can be thought of as the center of the view provided by virtual optical centers 1306 and 1304 in the direction of arrow 1332. Arrow 1334 of line 1324 can be thought of as the center of the view provided by virtual optical centers 1304 and 1308 in the direction of arrow 1334. Arrow 1336 of line 1320 can be thought of as the center of the view provided by virtual optical centers 1306 and 1308 in the direction of arrow 1336. Thus, different ordered pairs of virtual optical centers a re best used for stereoscopic views in different directions. As a user changes the direction of view, the virtual optical centers used to provide images for the left and right eyes will change. When viewing an image with a center between lines 1340 and 1342, images provided to the left and right eyes of the user are provided by virtual optical centers 1306 and 1304, respectively. When viewing an image with a center between lines 1342 and 1344, the images provided by virtual optical centers 1308 and 1304 are used to provide left and right images, respectively. When the user is viewing an image with a center between lines 1344 and 1346, left and right eyes receive images from virtual optical centers 1308 and 1306, respectively. When the user is viewing an image with a center between lines 1348 and 1346, left and right images are provided to the user from virtual optical centers 1304 and 1306, respectively. When the viewer is viewing an image with a center between lines 1350 and 1348, left and right images are provided to the user from virtual optical centers 1304 and 1308, respectively. Finally, when the user is viewing an image with a center between lines 1340 and 1350, images are provided to the left and right eyes from virtual optical centers 1306 and 1308, respectively.

Figure 31:
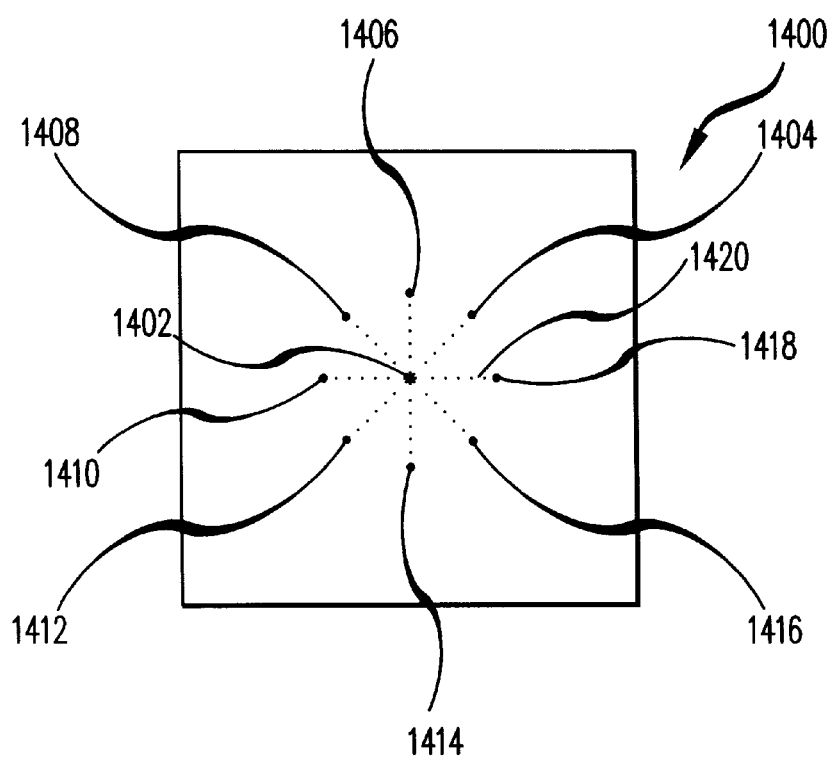
FIG. 31 illustrates a reflective pyramid with eight virtual optical centers.

FIG. 31 illustrates reflective pyramid 1400 looking at the base from outside the pyramid with axis 1402 passing through the vertex of the pyramid and perpendicular to the base of the pyramid. Pyramid 1400 has eight sets of cameras associated with eight virtual optical centers 1404, 1406, 1408, 1410, 1412, 1414, 1416 and 1418. The virtual optical centers are equal distance 1420 from axis 1402. Each pair of opposite virtual optical centers such as optical centers 1404 and 1412 are a distance two times the distance 1420. The distance two times distance 1420 should be approximately equal to the typical distance between a pair of human eyes.

Figure 32:
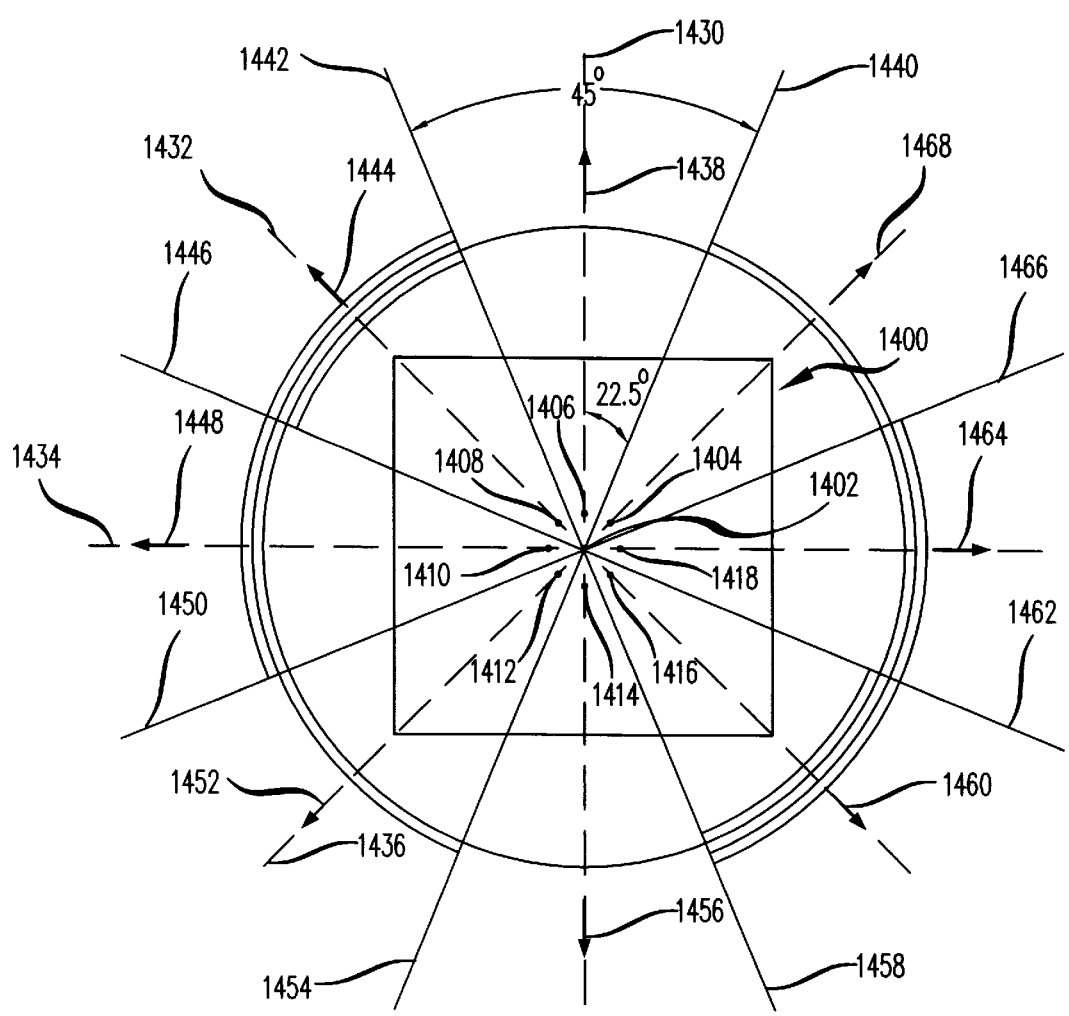
FIG. 32 illustrates using different pairs of virtual optical centers for different viewing directions.

FIG. 32 illustrates the panoramic viewer of FIG. 31 with reference lines used to illustrate which pair of virtual optical centers are used to provide images based on which direction a viewer desires to see. Reference line 1430 is drawn through virtual optical center 1406, axis 1402, and virtual optical center 1414. Reference line 1432 is drawn through virtual optical center 1408, axis 1402, and virtual optical center 1416. Reference line 1434 is drawn through virtual optical center 1410, axis 1402, and virtual optical center 1418. Reference line 1436 is drawn through virtual optical center 1412, axis 1402, and virtual optical center 1404. In this example, when the user requests a view within approximately 22.5 degrees of a reference line, the set of virtual optical centers associated with that reference line and that viewing direction is used to provide the left and right images to the user. When the user requests a view in the direction of arrow 1438 of line 1430, and between lines 1440 and 1442, the viewer uses the image from virtual optical center 1410 for a left eye image and the image from virtual optical center 1418 as a right eye image. When the user requests a view in the direction of arrow 1444 of line 1432, and between lines 1446 and 1442, the left and right images are provided by virtual optical centers 1412 and 1404, respectively. When the user requests a view in the direction of arrow 1448 of line 1434, and between lines 1450 and 1446, the left and right images are provided by virtual optical centers 1414 and 1406, respectively. When the user requests a view in the direction of arrow 1452 of line 1436, and between lines 1454 and 1450, the left and right images are provided by virtual optical centers 1416 and 1408, respectively. When the user requests a view in the direction of arrow 1456 of line 1430, and between lines 1454 and 1458, the left and right images are provided by virtual optical centers 1418 and 1410, respectively. When the user requests a view in the direction of arrow 1460 of line 1432 and between lines 1458 and 1462, the left and right images are provided by virtual optical centers 1404 and 1412, respectively. When the user requests a view in the direction of arrow 1464 of line 1434, and between lines 1466 and 1462, the left and right images are provided by virtual optical centers 1406 and 1414, respectively. When the user requests a view in the direction of arrow 1468 of line 1634, and between reference lines 1440 and 1466, the left and right images are provided by virtual optical centers 1408 and 1416, respectively.

Although a pyramid configuration has been discussed in this example, different planar mirror geometries may be used to redirect fields of view so that the cameras have virtual optical centers that are substantially co-located. For example, solid, hollow or partial polyhedrons may be used. Additionally, in the case of a pyramid configuration the base and vertex do not have to be physically present and can be thought of as conceptual aids such as a base plane or end and vertex point or end.

Figure 33:
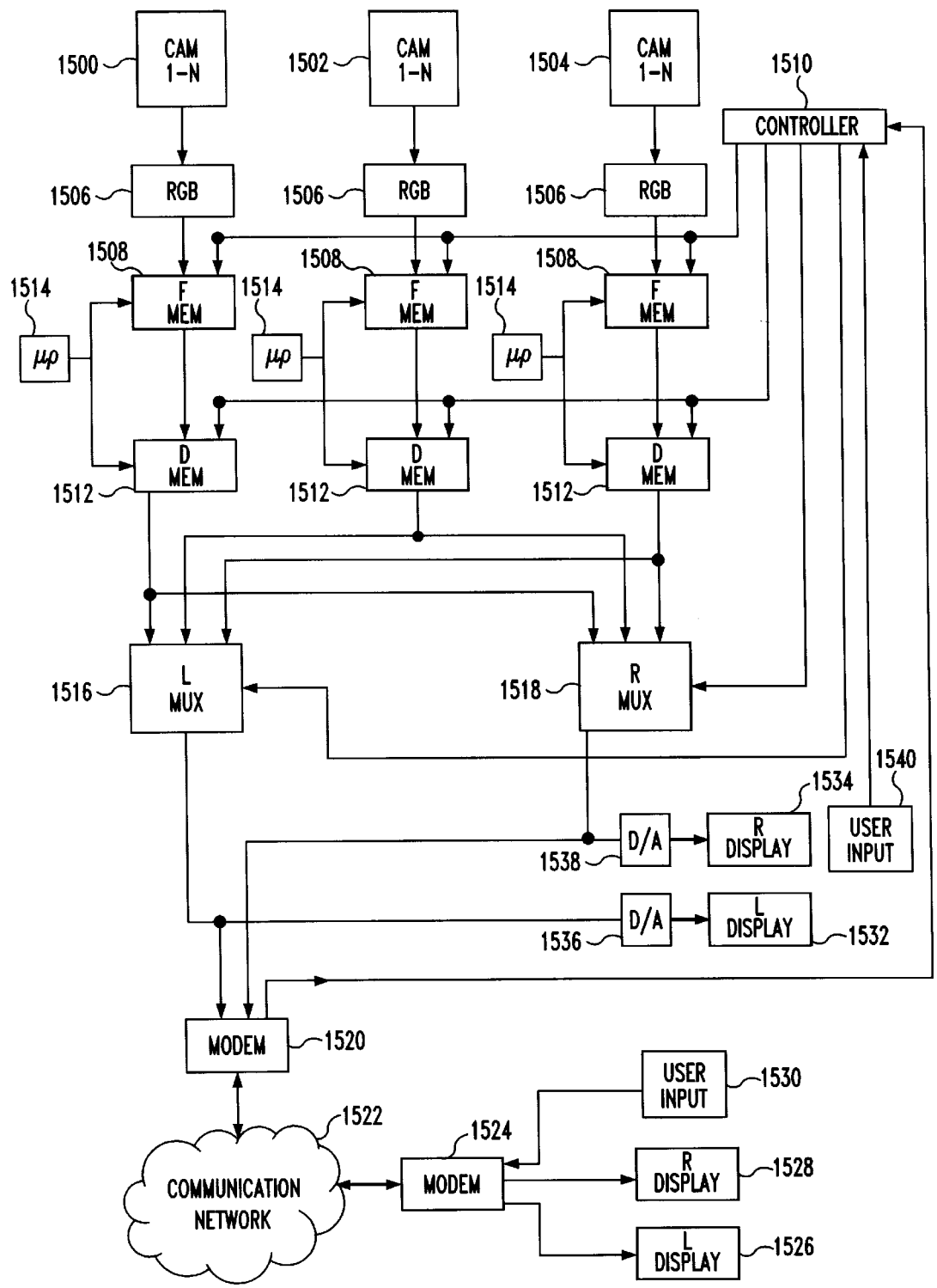
FIG. 33 illustrates a block diagram of a panoramic viewing system with three virtual optical centers.

FIG. 33 illustrates a block diagram of a stereo panoramic viewing system having three virtual optical centers. The block diagram is similar to FIG. 23 in that the functions provided to each set of cameras is similar to that shown in FIG. 23. In this example, camera sets 1500, 1502, and 1504 correspond to virtual optical centers 1304, 1306, and 1308 of FIG. 29, respectively. In this example each camera set includes four cameras. The output of each camera set is received by red/green/blue correction circuitry 1506. Red/green/blue correction circuitry 1506 operates similar to the circuitry described with regard to FIG. 23. The output of red/green/blue correction circuitry 1506 is stored by frame memory units 1508. The data representing the images captured by the cameras is written into the frame memories using addresses provided by controller 1510. Controller 1510 provides addressing to the frame memories as discussed with regard to FIG. 23 and FIGS. 7–9. Controller 1510 may be implemented using specialized hardware such as an ASIC (Application Specific Integrated Circuit), a microcomputer or microprocessor. Data is read from frame memories 1508 and put in display memories 1512 under control of microprocessors 1514. When writing the data into display memories 1512, the microprocessors use image mapping to correct for distortions that were introduced by the camera system. This image mapping process is similar to the process that was described with regard to FIGS. 20–22. The output from display memories 1512 is again addressed by controller 1510 in the manner similar to that which was discussed with regard to FIGS. 7–9. These outputs may be provided based on a user input that specifies a direction to be viewed. The output of display memories 1512 is provided to a switch, which in this embodiment is implemented as left multiplexor 1516 and right multiplexor 1518. Each multiplexor is used to select image data from a camera set associated with one of the virtual optical centers. The switch may be implemented using, for example, a mechanical switch, a bus with the selected memory enabled onto the bus, or a microcomputer or microprocessor that accesses the selected memory. The selection of image data associated with a particular virtual optical center is under control of controller 1510 based on a view selected by a user through a user input. The actual image data provided in response to user input is provided as discussed with regard to FIG. 30. It is also possible to provide the entire display memory output for each virtual optical center for viewing and possible editing by a user. Left and right image data provided by multiplexors 1516 and 1518 can then be provided to a modem 1520 for transfer over communication network 1522. It is also possible to eliminate modem 1520 if communication network 1522 accepts digital data directly. The data from communication network 1522 is received by modem 1524 which then provides data to left and right displays 1526 and 1528. If displays 1526 and 1528 require analog data, digital to analog converters may be placed between modem 1524 and a display. User input device 1530, if used, may be a device such as a joy stick which provides user selection data to controller 1510 through modem 1524, communication network 1522 and modem 1520. If the user is not a great distance from the viewing system, the data from multiplexors 1516 and 1518 may be passed directly to left display 1532 and right display 1534. If the displays require analog data, digital to analog converters 1536 and 1538 may be used to provide data to left display 1532 and right 1534, respectively. Additionally, user input device 1540 may be used to provide user selection data to controller 1510.

If viewing systems using additional virtual optical centers such as the system described in regard to FIG. 32, additional processing paths may be added to the basic layout of FIG. 33. With regard to FIG. 34, it should be noted that the number of cameras in camera sets 1500, 1502 and 1504 may vary. For instance, if only three sides of a four-sided pyramid are used for viewing, only three cameras need be included in the camera sets.

It should be noted that controller 1510 and microprocessors 1514 may be combined into a single microprocessor, microcomputer, or computer with sufficient processing speed to provide the addressing needs for the discussed functions. Similarly, the frame memories and the display memories may be combined into a single memory that is addressed so that the data associated with each of the memories of FIG. 33 may be accessed.

The invention claimed is:

1. A panoramic viewing apparatus, comprising:

a plurality of first image processing devices, each having a field of view;

a plurality of second image processing devices, each having a field of view; and a plurality of planar reflective facets facing in different directions, where each of at least two of the facets redirects the field of view of one of the first image processing devices and one of the second image processing devices, such that at least portions of the redirected fields of view of at least two of the first image processing devices are substantially contiguous, and such that at least portions of the redirected fields of view of at least two of the second image processing devices are substantially contiguous.

2. The panoramic viewing apparatus of claim 1, wherein the image processing devices are cameras.

3. The panoramic viewing apparatus of claim 1, wherein the image processing devices are projectors.

4. A panoramic viewing apparatus, comprising:

a plurality of first image processing devices, each having a field of view;

a plurality of second image processing devices, each having a field of view;

a plurality of third image processing devices, each having a field of view; and a plurality of planar reflective facets facing in different directions, where each of at least two of the facets redirects the field of view of one of the first image processing devices, one of the second image processing devices and one of the third image processing devices, such that at least portions of the redirected fields of view of at least two of the first image processing devices are substantially contiguous, such that at least portions of the redirected fields of view of at least two of the second image processing devices are substantially contiguous and such that at least portions of the redirected fields of view of at least two of the third image processing devices are substantially contiguous.

5. The panoramic viewing apparatus of claim 4, wherein the image processing devices are cameras.

6. The panoramic viewing apparatus of claim 4, wherein the image processing devices are projectors.

7. A panoramic viewing apparatus, comprising:

a plurality of first image processing devices producing a first set of image signals, each having a field of view;

a plurality of second image processing devices producing a second set of image signals, each having a field of view;

a plurality of third image processing devices producing a third set of image signals, each having a field of view;

a plurality of planar reflective facets facing in different directions, where each of at least two of the facets redirects the field of view of one of the first image processing devices, one of the second image processing devices and one of the third image processing devices, such that at least portions of the redirected fields of view of at least two of the first image processing devices are substantially contiguous, such that at least portions of the redirected fields of view of at least two of the second image processing devices are substantially contiguous and such that at least portions of the redirected fields of view of at least two of the third image processing devices are substantially contiguous;

a controller that produces a control signal that identifies pairs of image data sets from a plurality of image data sets where each image data set is representative of one of the sets of image signals; and a switch that selects pairs of image data sets in response to the control signal.

8. The panoramic viewing apparatus of claim 7, wherein the switch is a multiplexer.

9. The panoramic viewing apparatus of claim 7, wherein the switch is a computer.

10. The panoramic viewing apparatus of claim 7, wherein the controller identifies pairs of image data sets based on a viewing direction.

11. A panoramic viewing apparatus, comprising:

a plurality of first image processing devices, each having an optical center and a field of view;

a plurality of second image processing devices, each having an optical center and a field of view; and a reflective element being at least partially polyhedral having a plurality of reflective facets facing in different directions, and forming a plurality of first virtual optical centers and a plurality of second virtual optical centers, where each of at least two of the plurality of reflective facets redirects the field of view of a first image processing device belonging to the plurality of first image processing devices to create a first virtual optical center corresponding to an optical center of the first image processing device, and the field of view of a second image processing device belonging to the plurality of second image processing devices to create a second virtual optical center corresponding to an optical center of the second device, the fields of viewing being redirected such that the plurality of first virtual optical centers are substantially co-located at a first location and the plurality of second virtual optical centers are substantially co-located at a second location.

12. The panoramic viewing apparatus of claim 11, wherein the reflective element is hollow.

13. The panoramic viewing apparatus of claim 1, wherein the reflective element is solid.

14. The panoramic viewing apparatus of claim 11, wherein the reflective element is at least a partial pyramid.

15. The panoramic viewing apparatus of claim 11, wherein the image processing devices are cameras.

16. The panoramic viewing apparatus of claim 11, wherein the image processing devices are image projectors.

17. The panoramic viewing apparatus of claim 11, wherein the reflective element has at least one non-reflective facet.

18. The panoramic viewing apparatus of claim 11, further comprising a plurality of third image processing devices, each having an optical center and a field of view where the reflective element forms a plurality of third virtual optical centers and where each of at least two of the plurality of reflective facets redirects the field of view of one of the third image processing devices to create a third virtual optical center corresponding to the optical center of this device, the plurality of third virtual optical centers being substantially co-located at a third location.

19. A panoramic viewing system, comprising:

a plurality of first image processing devices producing a first set of image signals, each image processing device having an optical center and a field of view; and a plurality of second image processing devices producing a second set of image signals, each image processing device having an optical center and a field of view;

a plurality of third image processing devices producing a third set of image signals, each image processing device having an optical center and a field of view;

a reflective element being at least partially polyhedral having a plurality of reflective facets facing in different directions, and forming a plurality of first virtual optical centers, a plurality of second virtual optical centers and a plurality of third virtual optical centers, where each of at least two of the plurality of reflective reflective facets redirects the field of view of a first image processing device belonging to the plurality of first image processing devices to create a first virtual optical center corresponding to an optical center of the first device, the field of view of a second image processing device belonging to the plurality of second image processing devices to create a second virtual optical center corresponding to an optical center of the second device, and the field of view of a third image processing device belonging to the plurality of third image processing devices to create a third virtual optical center corresponding to an optical center of the third device, the fields of view being redirected such that the plurality of the first virtual optical centers are substantially co-located at a first location, the plurality of second virtual optical centers are substantially co-located at a second location and the plurality of third virtual optical centers are substantially co-located at a third location;

a controller that produces a control signal that identifies pairs of image data sets from a plurality of image data sets where each image data set is representative of one of the sets of image signals;

and a switch that selects pairs of image data sets in response to the control signal.

20. The panoramic viewing apparatus of claim 19, wherein the reflective element is hollow.

21. The panoramic viewing apparatus of claim 19, wherein the reflective element is solid.

22. The panoramic viewing apparatus of claim 19, wherein the reflective element is at least a partial pyramid.

23. The panoramic viewing apparatus of claim 19, wherein the image processing devices are cameras.

24. The panoramic viewing apparatus of claim 19, wherein the image processing devices are projectors.

25. The panoramic viewing apparatus of claim 19, wherein the reflective element has at least one non-reflective facet.

26. The panoramic viewing apparatus of claim 19, wherein the switch is a multiplexer.

27. The panoramic viewing apparatus of claim 19, wherein the switch is a computer.

28. The panoramic viewing apparatus of claim 19, wherein the controller identifies pairs of image data sets based on a viewing direction.

* * * * *